United States Patent
Herzog et al.

(10) Patent No.: US 12,080,925 B1
(45) Date of Patent: Sep. 3, 2024

(54) ELECTROCHEMICAL CELL SYSTEM CONTAINING AIR BAFFLE ASSEMBLY WITH AIR BYPASS MITIGATION FEATURES AND METHOD OF OPERATING THEREOF

(71) Applicant: BLOOM ENERGY CORPORATION, San Jose, CA (US)

(72) Inventors: Ralion Herzog, Sunnyvale, CA (US); Kyle Kekelis, Oakland, CA (US); David Edmonston, Soquel, CA (US); Jake Lung, Phoenix, AZ (US); Rupa Sindhu Gunnam, Fremont, CA (US); Karanpal Bhangu, Manteca, CA (US); Jesse Doty, Santa Maria, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/352,092

(22) Filed: Jul. 13, 2023

(51) Int. Cl.
| H01M 8/04746 | (2016.01) |
| C25B 9/67 | (2021.01) |
| C25B 9/70 | (2021.01) |
| H01M 8/04014 | (2016.01) |
| H01M 8/243 | (2016.01) |

(52) U.S. Cl.
CPC ........... *H01M 8/04753* (2013.01); *C25B 9/70* (2021.01); *H01M 8/243* (2013.01); *C25B 9/67* (2021.01); *H01M 8/04014* (2013.01)

(58) Field of Classification Search
None
See application file for complete search history.

(56) References Cited

U.S. PATENT DOCUMENTS

| 8,785,074 B2 | 7/2014 | Edmonston et al. | |
| 9,812,729 B2 | 11/2017 | Edmonston et al. | |
| 10,211,479 B2 | 2/2019 | Edmonston et al. | |
| 11,355,762 B2 | 6/2022 | Gasda et al. | |
| 2007/0196704 A1* | 8/2007 | Valensa | H01M 8/0618 429/495 |
| 2010/0009221 A1* | 1/2010 | Ballantine | H01M 8/04022 429/423 |
| 2011/0076585 A1* | 3/2011 | Edmonston | H01M 8/2485 429/454 |
| 2012/0178003 A1* | 7/2012 | Venkataraman | H01M 8/04007 429/408 |
| 2014/0057184 A1* | 2/2014 | Pillai | H01M 8/0263 429/410 |
| 2015/0111121 A1* | 4/2015 | Weingaertner | H01M 8/0618 429/425 |

(Continued)

OTHER PUBLICATIONS

U.S. Appl. No. 18/055,081, filed Nov. 14, 2022.

*Primary Examiner* — Haroon S. Sheikh
(74) *Attorney, Agent, or Firm* — THE MARBURY LAW GROUP PLLC

(57) ABSTRACT

An electrochemical cell system includes electrochemical cell columns arranged in an annular configuration over a support, each cell column having a front side that faces away from a center of the annular configuration, a back side that faces the center of the annular configuration, and opposing first and second sides that connect the front and back sides, and multi-component baffle assemblies located between adjacent cell columns and including at least one air bypass mitigation feature configured to reduce or prevent air from flowing between the cell columns.

23 Claims, 14 Drawing Sheets

(56) References Cited

U.S. PATENT DOCUMENTS

| | | | |
|---|---|---|---|
| 2015/0357669 A1* | 12/2015 | Huynh | H01M 8/243 |
| | | | 429/513 |
| 2016/0226093 A1* | 8/2016 | Edmonston | H01M 8/04298 |
| 2017/0104233 A1* | 4/2017 | Armstrong | H01M 8/247 |
| 2019/0051923 A1* | 2/2019 | Ashary | H01M 8/2485 |
| 2019/0109345 A1* | 4/2019 | Edmonston | H01M 8/0282 |
| 2019/0372132 A1* | 12/2019 | Gasda | H01M 8/2483 |
| 2020/0127308 A1* | 4/2020 | Petrucha | F16L 13/08 |
| 2020/0168922 A1* | 5/2020 | Weingaertner | H01M 8/04761 |
| 2020/0168932 A1* | 5/2020 | Ramanan | H01M 8/04753 |
| 2021/0242476 A1* | 8/2021 | Huynh | H01M 8/12 |
| 2022/0278341 A1 | 9/2022 | Gasda et al. | |
| 2022/0393219 A1 | 12/2022 | Edmonston et al. | |
| 2023/0146025 A1 | 5/2023 | Patel et al. | |

\* cited by examiner

ELECTROCHEMICAL CELL SYSTEM CONTAINING AIR BAFFLE ASSEMBLY WITH AIR BYPASS MITIGATION FEATURES AND METHOD OF OPERATING THEREOF

FIELD

Aspects of the present invention relate to electrochemical cell systems, and more particularly, to electrochemical cell systems with air baffle assemblies including air bypass mitigation features.

BACKGROUND

Fuel cells, such as solid oxide fuel cells, are electrochemical devices which can convert energy stored in fuels to electrical energy with high efficiency. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

According to various embodiments, an electrochemical cell system comprises electrochemical cell columns arranged in an annular configuration over a support, each cell column having a front side that faces away from a center of the annular configuration, a back side that faces the center of the annular configuration, and opposing first and second sides that connect the front and back sides; and multi-component baffle assemblies located between adjacent cell columns and comprising at least one air bypass mitigation feature configured to reduce or prevent air from flowing between the cell columns.

According to various embodiments, a method comprises providing a reactant into electrochemical cell columns arranged in an annular configuration over a support, each cell column having a front side that faces away from a center of the annular configuration, a back side that faces the center of the annular configuration, and opposing first and second sides that connect the front and back sides, wherein baffle assemblies are located between adjacent cell columns; and providing air into the front side of each cell column, wherein at least one air bypass mitigation feature of the baffle assemblies reduces or prevents the air from flowing between the cell column by at least one of restraining the baffle assemblies and the cell columns from separating, forcing the baffle assemblies and the cell columns against each other, or encapsulating the baffle assembles to keep them in contact with the cell columns.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Figure 1A:
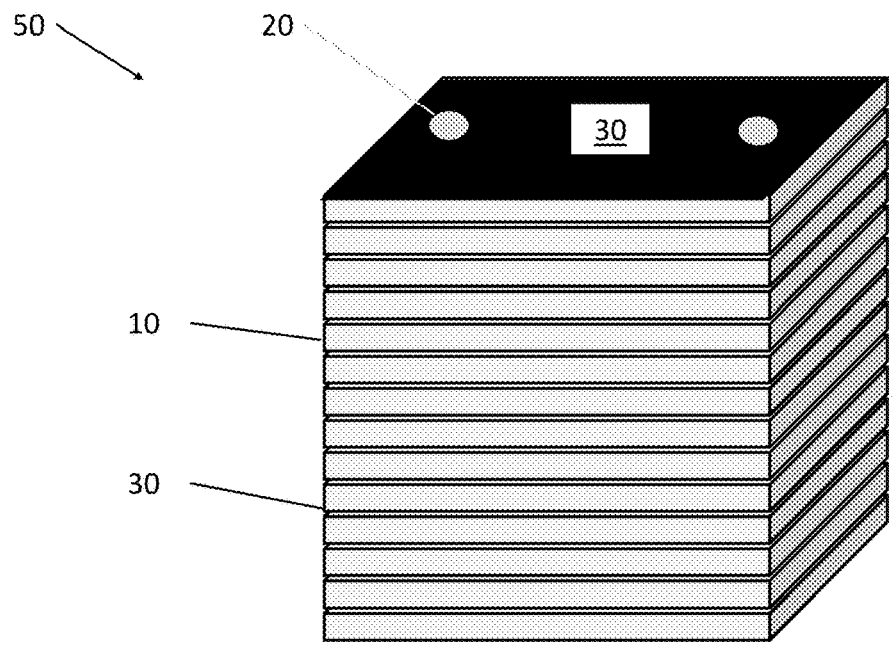
FIG. 1A is a perspective view of a counter-flow solid oxide fuel cell (SOFC) stack, according to various embodiments of the present disclosure.

As set forth herein, various aspects of the disclosure are described with reference to the exemplary embodiments and/or the accompanying drawings in which exemplary embodiments of the invention are illustrated. This invention may, however, be embodied in many different forms and should not be construed as limited to the exemplary embodiments shown in the drawings or described herein. It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

Electrochemical cell systems include fuel cell and electrolyzer cell systems. In a high temperature fuel cell system, such as a solid oxide fuel cell (SOFC) system, an oxidizing flow is directed to the cathode side of the fuel cell while a fuel flow is directed to the anode side of the fuel cell. The oxidizing flow is typically air, while the fuel flow can be a hydrogen ($H_2$) or a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the oxygen ions combine with either free hydrogen or hydrogen in a hydrocarbon molecule to form water vapor and/or with carbon monoxide to form carbon dioxide. The excess electrons from the negatively charged ions are routed back to the cathode side of the fuel cell through an electrical circuit completed between anode and cathode, resulting in an electrical current flow through the circuit. In an electrolyzer system, such as a solid oxide electrolyzer system, water (e.g., steam) is separated into hydrogen and oxygen by applying a voltage across the electrolyzer cells.

Figure 1B:
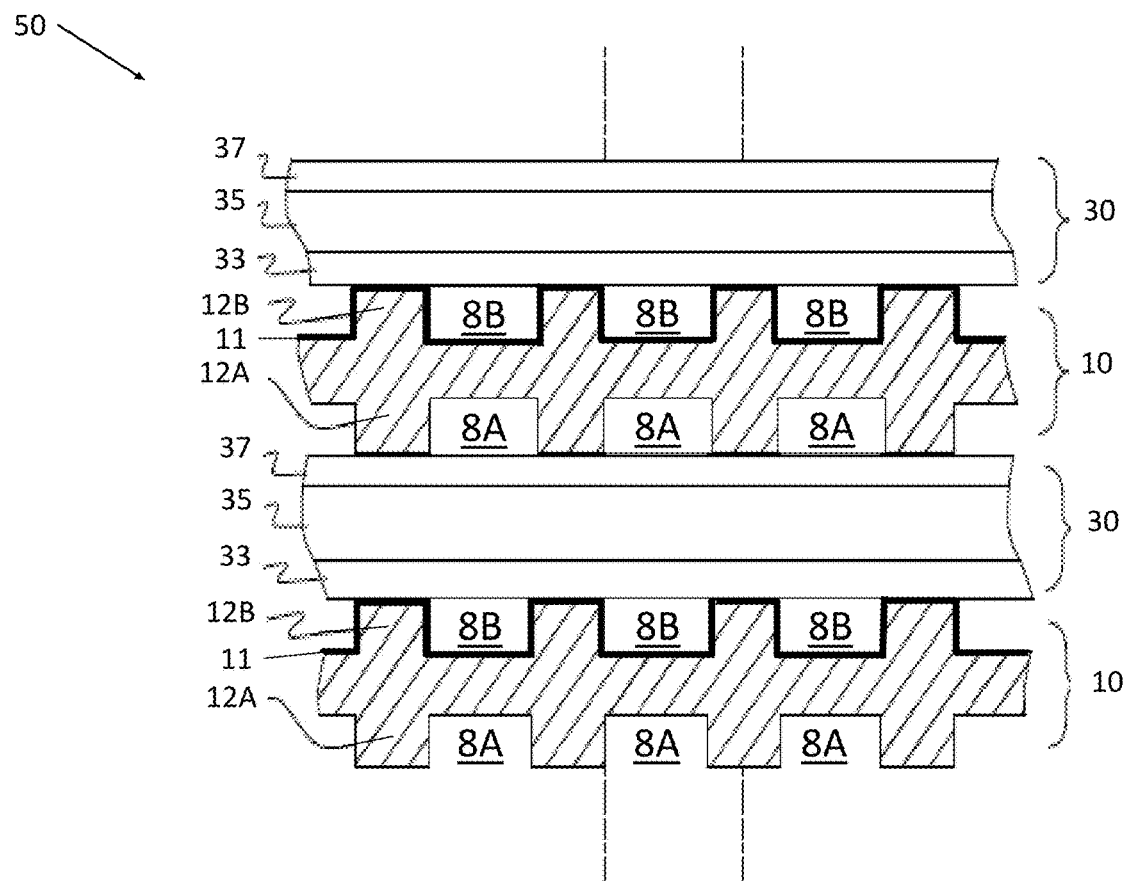
FIG. 1B is a sectional view of a portion of the stack of FIG. 1A.
Figure 1C:
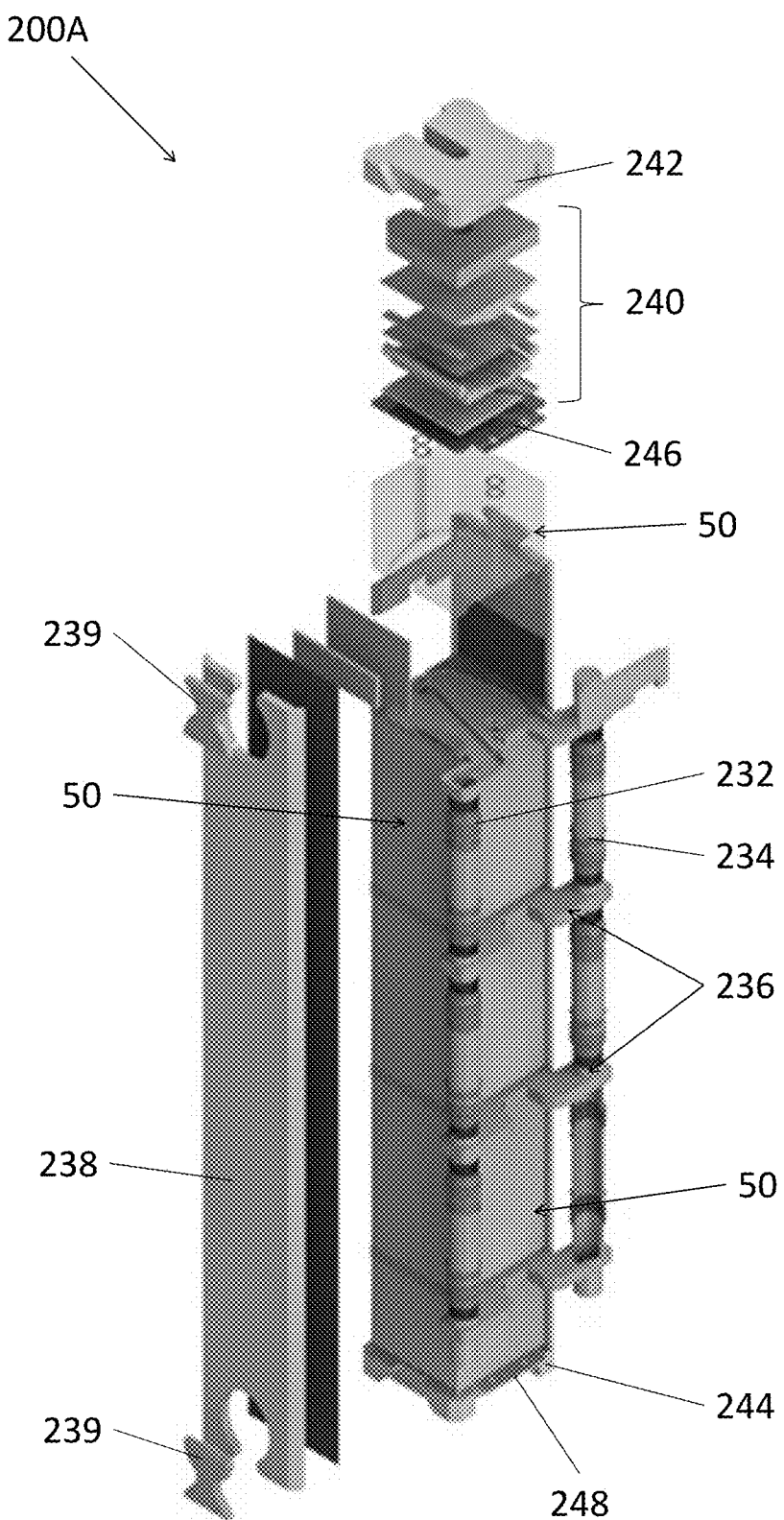
FIG. 1C is a perspective view of an externally manifolded cell column 200A including stacks of FIG. 1A.

FIG. 1A is a perspective view of a counter-flow electrochemical stack 50, FIG. 1B is a sectional view of a portion of the stack 50, according to various embodiments of the present disclosure, and FIG. 1C is a perspective view of an externally manifolded electrochemical cell column 200A including stacks 50 of FIG. 1A.

In the embodiments below, the stack 50 is described as being operated as a solid oxide fuel cell (SOFC) stack 50. However, it should be noted that the stack 50 may also be operated as an electrolyzer (e.g., a solid oxide electrolyzer cell (SOEC) stack).

Referring to FIGS. 1A and 1B, the stack 50 includes electrochemical cells 30, such as fuel cells (e.g., SOFCs) or electrolyzer cells (e.g., SOECs), separated by interconnects 10. In the embodiments below, the electrochemical cells 30 are described as being fuel cells. Referring to FIG. 1B, each fuel cell 30 comprises a cathode electrode 33, a solid oxide electrolyte 35, and an anode electrode 37. In some embodiments, the fuel cells 30 may include a conductive layer, such as a nickel mesh, disposed between the anode electrode 37 and an adjacent interconnect 10.

Various materials may be used for the cathode electrode 33, electrolyte 35, and anode electrode 37. For example, the anode electrode 37 may comprise a cermet comprising a nickel containing phase and a ceramic phase. The nickel containing phase may consist entirely of nickel in a reduced state. This phase may form nickel oxide when it is in an oxidized state. Thus, the anode electrode 37 is preferably annealed in a reducing atmosphere prior to operation to reduce the nickel oxide to nickel. The nickel containing phase may include other metals in addition to nickel and/or nickel alloys. The ceramic phase may comprise a stabilized zirconia, such as yttria and/or scandia stabilized zirconia and/or a doped ceria, such as gadolinia, yttria and/or samaria doped ceria.

The electrolyte 35 may comprise a stabilized zirconia, such as scandia stabilized zirconia (SSZ) or yttria stabilized zirconia (YSZ). Alternatively, the electrolyte 35 may comprise another ionically conductive material, such as a doped ceria.

The cathode electrode 33 may comprise an electrically conductive material, such as an electrically conductive perovskite material, such as lanthanum strontium manganite (LSM). Other conductive perovskites, such as LSCo, etc., or metals, such as Pt, may also be used. The cathode electrode 33 may also contain a ceramic phase similar to the anode electrode 37. The electrodes and the electrolyte may each comprise one or more sublayers of one or more of the above described materials.

Fuel cell stacks 50 are frequently built from a multiplicity of SOFC's 30 in the form of planar elements, tubes, or other geometries. Although the fuel cell stack 50 in FIG. 1A is vertically oriented, fuel cell stacks may be oriented horizontally or in any other direction. Fuel and air may be provided to the electrochemically active surface, which can be large. For example, fuel may be provided through fuel holes (e.g., fuel riser openings) 20 that extend through the interconnects 10 and fuel cells 30 to form fuel conduits that extend through the stack 50.

Each interconnect 10 electrically connects adjacent fuel cells 30 in the stack 50. In particular, an interconnect 10 may electrically connect the anode electrode 37 of one fuel cell 30 to the cathode electrode 33 of an adjacent fuel cell 30. FIG. 1B shows that the lower fuel cell 30 is located between two interconnects 10. An optional Ni mesh may be used to electrically connect the interconnect 10 to the anode electrode 37 of an adjacent fuel cell 30.

Each interconnect 10 includes fuel ribs 12A that at least partially define fuel channels 8A and air ribs 12B that at least partially define oxidant (e.g., air) channels 8B. The interconnect 10 may operate as a gas-fuel separator that separates a fuel, such as a hydrocarbon fuel, flowing to the fuel electrode (i.e., anode 37) of one cell in the stack from oxidant, such as air, flowing to the air electrode (i.e., cathode 33) of an adjacent cell in the stack. The air and fuel may flow in opposite directions, such that the fuel cell stack 50 has a counter-flow configuration.

Each interconnect 10 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 10 may each include a metallic substrate comprising a high-temperature stable metal alloy, such as a chromium-iron alloy, such as 4-6 weight percent iron, optionally 1 or less weight percent yttrium and balance chromium alloy and may electrically connect the anode or fuel-side of one fuel cell 30 to the cathode or air side of an adjacent fuel cell 30. An electrically conductive contact layer, such as a nickel layer or mesh, may be provided between anode electrodes 37 and a fuel side of each interconnect 10.

An electrically conductive protective layer 11 may be provided on at least an air side of each interconnect 10. The protective layer 11 may be configured to decrease the growth rate of a chromium oxide surface layer on the interconnect 10 and to suppress evaporation of chromium vapor species which can poison fuel cell cathodes 33. The protective layer 11 may be a perovskite layer such as lanthanum strontium manganite (LSM), and may be formed using a spray coating or dip coating process. Alternatively, other metal oxide coatings, such as a spinel, such as an (Mn, Co) 304 spinel (MCO), can be used instead of or in addition to LSM. Any spinel having the composition $Mn_{2-x}Co_{1+x}O_4$ (0≤x≤1) or written as $z(Mn_3O_4)+(1-z)(Co_3O_4)$, where (⅓≤z≤⅔) or written as (Mn, Co)$_3$O$_4$ may be used. In other embodiments, a mixed layer of LSM and MCO, or a stack of LSM and MCO layers may be used as the protective layer 11.

Referring to FIG. 1C, the cell column 200A may include one or more stacks 50 and may be externally manifolded for air and internally manifolded for fuel. In particular, the cell column 200A may include a fuel inlet conduit 232, an anode exhaust (i.e., fuel exhaust) conduit 234, and anode feed/return assemblies 236 (e.g., anode splitter plates (ASPs)). The cell column 200A may also include side baffles 238, a compression assembly 240, a top plate 242, a bottom plate 244, a top terminal plate 246, and a bottom terminal plate 248. The side baffles 238, components of the compression assembly 240, the top plate 242, the bottom plate 244, and may be formed of a ceramic material. The side baffles 238 may be connected to the top plate 242 and the bottom plate 248 by ceramic connectors 239. The compression assembly 240 may be configured to generate a biasing force between the top plate and the stacks 50, so as to compress the stacks 50. For example, the compression assembly 240 may include a biasing element and other support elements and/or plates. The terminal plates 246, 248 may comprise a metal alloy and may be electrically connected to the stacks 50. The cell columns 200B may be located on a support 101 (see FIG. 2C), such as a hot box base.

The fuel inlet conduit 232 is fluidly connected to the ASPs 236 and is configured to provide the fuel inlet stream to each ASP 236. The anode exhaust conduit 234 is fluidly connected to the ASPs 236 and is configured to receive anode (i.e., fuel) exhaust stream from each ASP 236. The ASPs 236 are disposed between the stacks 50 and are configured to provide the fuel inlet stream to the stacks 50 and to receive the anode fuel exhaust stream from the stacks 50. For example, the ASPs 236 may be fluidly connected to the fuel holes 20 formed in the stacks 50.

Figure 2A:
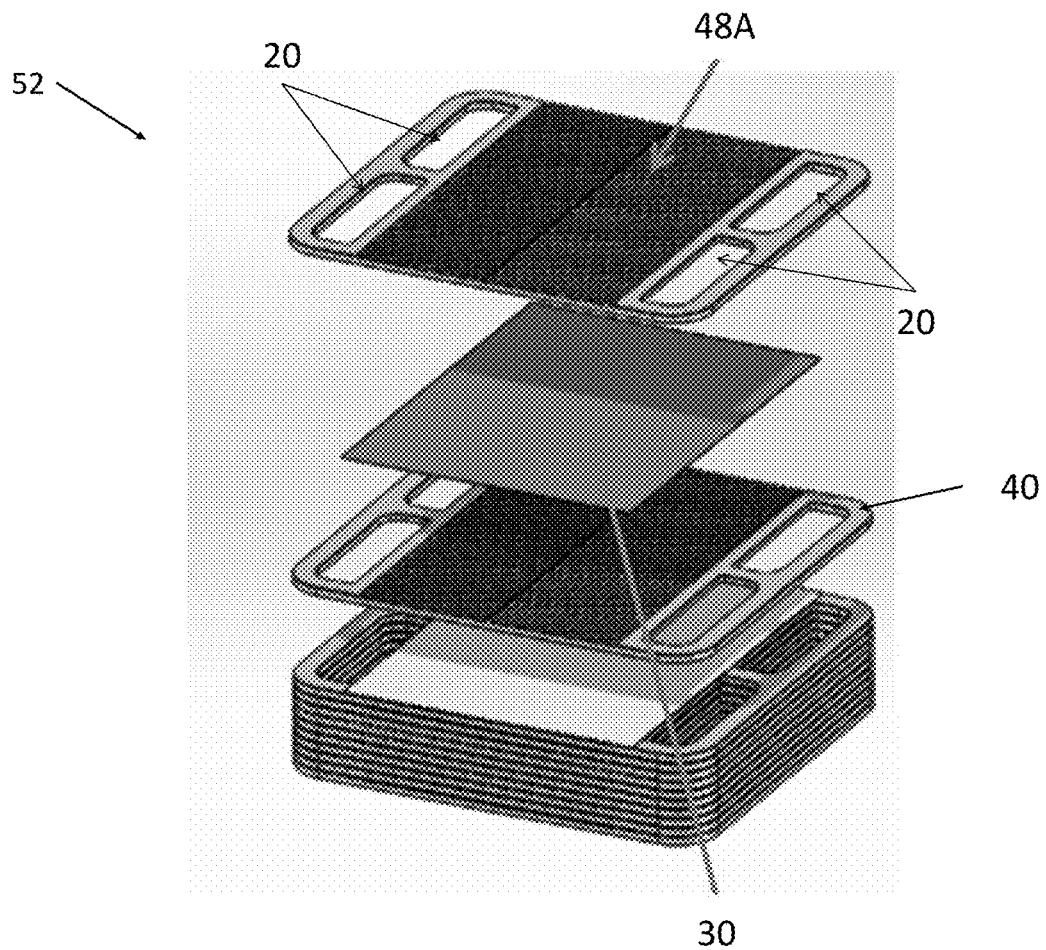
FIG. 2A is an exploded view of a cross flow fuel cell stack, according to various embodiments of the present disclosure.
Figure 2B:
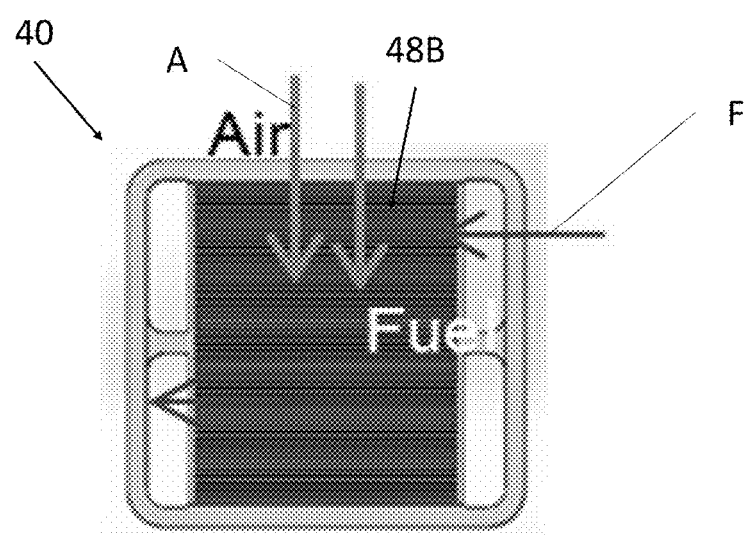
FIG. 2B is a top view of a fuel side of an interconnect of FIG. 2A.
Figure 2C:
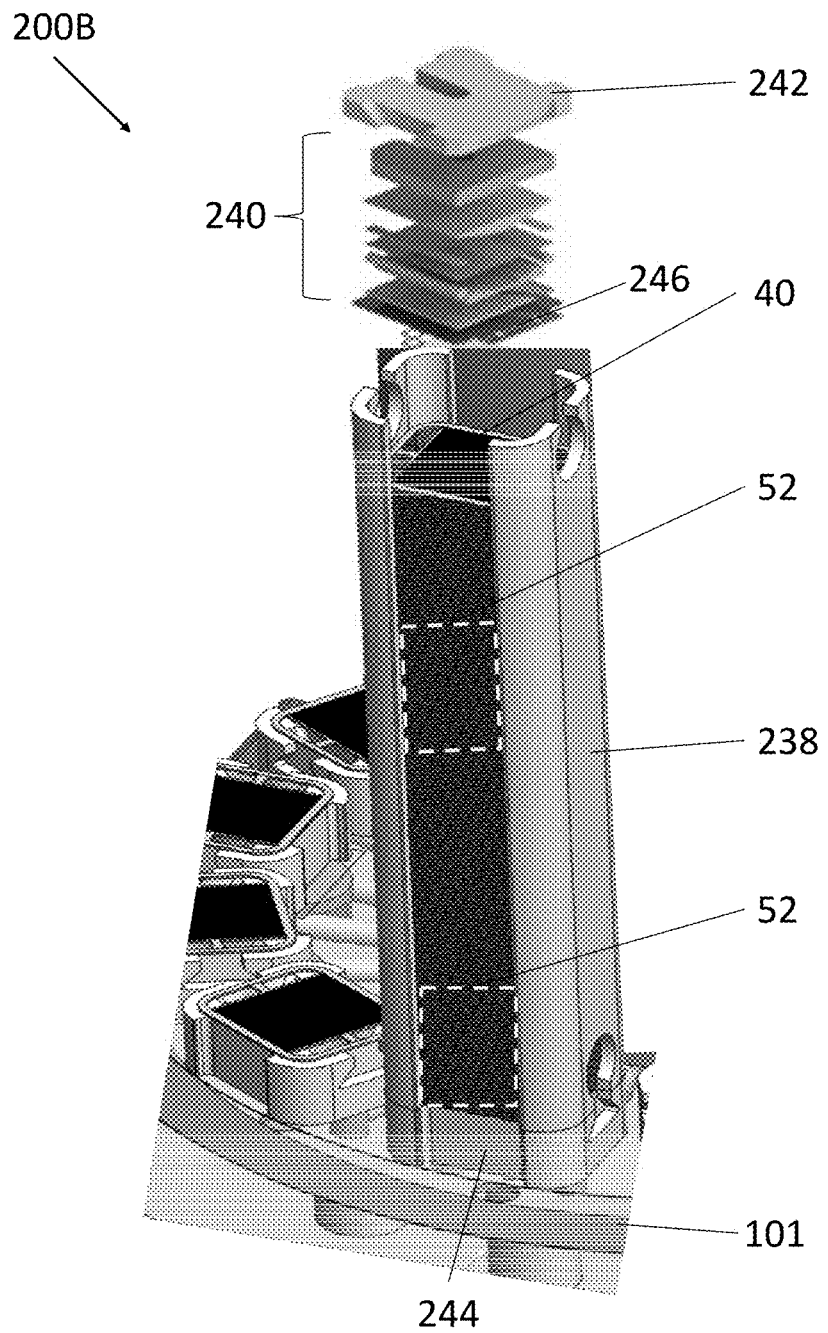
FIG. 2C is a perspective view of an internally manifolded cell column including fuel cell stacks of FIG. 2A.

FIG. 2A is an exploded view of a cross flow electrochemical cell stack, such as a fuel cell stack 52, according to various embodiments of the present disclosure, FIG. 2B is a top view of a fuel side of an interconnect 40 of FIG. 2A, and FIG. 2C is a perspective view of an electrochemical cell column 200B which lacks the ASPs and which includes fuel cell stacks 52 of FIG. 2A. The components of FIGS. 2A-2C may be similar to the components of FIGS. 1A-1C. As such, only the differences therebetween will be discussed in detail.

Referring to FIGS. 2A-2C, the electrochemical cell stack 52 includes electrochemical cells, such as fuel cells 30 separated by cross flow interconnects 40 that include fuel holes 20, air channels separated by air ribs in an air flow field 48A, and fuel channels separated by fuel ribs in the fuel flow field 48B on the opposite side of the interconnect 40 from the air flow field 48A. The air channels and fuel channels may extend in perpendicular directions. As such, an air flow direction A and a fuel flow direction F across each interconnect 40 and through the cell column 200B, may be perpendicular to one another. The fuel holes 20 may be larger and/or more numerous than the fuel holes of a counter flow interconnect 10. The fuel holes 20 may form fuel manifolds that do not pass through the fuel cells 30.

As shown in FIG. 2C, the cell column 200B may include multiple fuel cell stacks 52, side baffles 238, a top plate 242, a bottom plate 244, and a compression assembly 240. Due to the enlarged fuel holes 20, the cell column 200B may omit ASPs between the stacks 52. The side baffles 238 may connect the top plate 242 and the bottom plate 244, such that the compression assembly 240 may apply pressure to the stacks 52. The side baffles 238 may be curved baffle plates, such each baffle plate covers at least portions of three sides of the fuel cell stacks 52. Uncovered portions for the front and back sides of the stacks 52 allow the air to flow through the cell column 200B. The bottom plate 244 may be disposed below the stacks 52, may include multiple ceramic plates and may be configured to operate as a fuel plenum to provide a hydrogen-containing fuel feed to the stacks 52, and may receive an anode fuel exhaust from the stacks 52. The bottom plate 244 may be connected to fuel inlet and outlet conduits disposed below the cell column 200B.

One or more cell columns 200A or 200B may be thermally integrated with other components of an electrochemical system, such as a fuel cell power generating system (e.g., one or more anode tail gas oxidizers, fuel reformers, fluid conduits and manifolds, etc.) in a common enclosure or "hotbox", as discussed in detail below.

Figure 3:
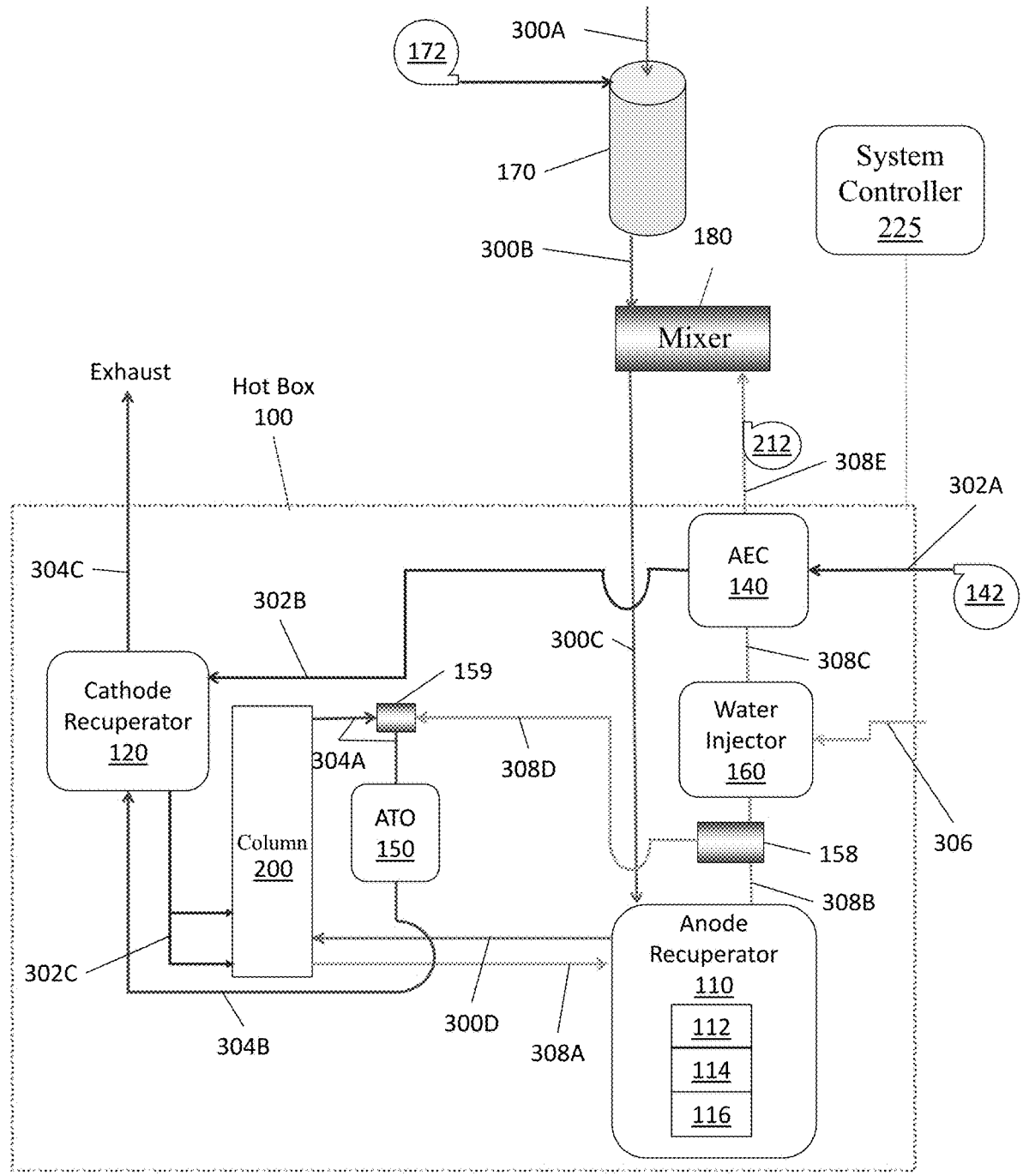
FIG. 3 is a schematic of a fuel cell system, according to various embodiments of the present disclosure.

FIG. 3 is a schematic representation of a SOFC system, according to various embodiments of the present disclosure. Referring to FIG. 3, the system includes a hotbox 100 and various components disposed therein or adjacent thereto. The hotbox 100 may contain cell columns 200, which may be internally or externally manifolded fuel cell columns as described above. However, in other embodiments the cell columns 200 may include electrolyzer cells configured to generate a fuel, such as hydrogen, by electrolyzing water.

The hotbox 100 may also contain an anode recuperator heat exchanger heat exchanger 110, a cathode recuperator heat exchanger 120, an anode tail gas oxidizer (ATO) 150, an anode exhaust cooler heat exchanger 140, an optional splitter 158, an optional vortex generator 159, and a water injector 160. Alternatively, the water injector 160 may be replaced with a steam generator which provides steam into the fuel inlet stream. The system may also include a catalytic partial oxidation (CPOx) reactor 170, a mixer 180, a CPOx blower 172 (e.g., air blower), a main air blower 142 (e.g., system blower), and an anode recycle blower 212, which may be disposed outside of the hotbox 100. However, the present disclosure is not limited to any particular location for each of the components with respect to the hotbox 100.

The CPOx reactor 170 receives a fuel inlet stream from a fuel source, through fuel conduit 300A. The fuel source may be a fuel tank or a utility natural gas line including a valve to control an amount of fuel provided to the CPOx reactor 170. The CPOx blower 172 may provide air to the CPOx reactor 170 during system start-up. The fuel and/or air may be provided to the mixer 180 by fuel conduit 300B. Fuel (e.g., the fuel inlet stream) flows from the mixer 180 to the anode recuperator 110 through fuel conduit 300C. The fuel is heated in the anode recuperator 110 by a portion of the fuel exhaust and the fuel then flows from the anode recuperator 110 to the stack 102 through fuel conduit 300D.

The main air blower 142 may be configured to provide an air stream (e.g., air inlet stream) to the anode exhaust cooler 140 through air conduit 302A. Air flows from the anode exhaust cooler 140 to the cathode recuperator 120 through air conduit 302B. The air is heated by the ATO exhaust in the cathode recuperator 120. The air flows from the cathode recuperator 120 to the stack 102 through air conduit 302C.

An anode exhaust stream (e.g., the fuel exhaust stream) generated in the stack 102 is provided to the anode recuperator 110 through anode exhaust conduit 308A. The anode exhaust may contain unreacted fuel and may also be referred to herein as fuel exhaust. The anode exhaust may be provided from the anode recuperator 110 to the splitter 158 by anode exhaust conduit 308B. A first portion of the anode exhaust may be provided from the splitter 158 to the anode exhaust cooler 140 through the water injector 160 and the anode exhaust conduit 308C. A second portion of the anode exhaust is provided from the splitter 158 to the ATO 150 through the anode exhaust conduit 308D. The first portion of the anode exhaust heats the air inlet stream in the anode exhaust cooler 140 and may then be provided from the anode exhaust cooler 140 to the mixer 180 through the anode exhaust conduit 308E. The anode recycle blower 212 may be configured to move anode exhaust though anode exhaust conduit 308E, as discussed below.

Cathode exhaust generated in the stack 102 flows to the ATO 150 through exhaust conduit 304A. The vortex generator 159 may be disposed in exhaust conduit 304A and may be configured to swirl the cathode exhaust. The anode exhaust conduit 308D may be fluidly connected to the vortex generator 159 or to the cathode exhaust conduit 304A or the ATO 150 downstream of the vortex generator 159. The swirled cathode exhaust may mix with the second portion of the anode exhaust provided by the splitter 158 before being provided to the ATO 150. The anode exhaust may be oxidized by the cathode exhaust in the ATO 150 to generate an ATO exhaust. The ATO exhaust flows from the ATO 150 to the cathode recuperator 120 through exhaust conduit 304B. Exhaust flows from the cathode recuperator and out of the hotbox 100 through exhaust conduit 304C.

Water flows from a water source, such as a water tank or a water pipe, to the water injector 160 through water conduit 306. The water injector 160 injects water directly into a first portion of the anode exhaust provided in anode exhaust conduit 308C. Heat from the first portion of the anode exhaust (also referred to as a recycled anode exhaust stream) provided in anode exhaust conduit 308C vaporizes the water to generate steam. The steam mixes with the anode exhaust, and the resultant mixture is provided to the anode exhaust cooler 140. The mixture is then provided from the anode exhaust cooler 140 to the mixer 180 through the anode exhaust conduit 308E. The mixer 180 is configured to mix the steam and first portion of the anode exhaust with fresh fuel (i.e., fuel inlet stream). This humidified fuel mixture may then be heated in the anode recuperator 110 by the anode exhaust, before being provided to the stack 102. The system may also include one or more fuel reforming catalysts 112, 114, and 116 located inside and/or downstream of the anode recuperator 110. The reforming catalyst(s) reform the humidified fuel mixture before it is provided to the stack 102.

The system may further include a system controller 225 configured to control various elements of the system. The controller 225 may include a central processing unit configured to execute stored instructions. For example, the controller 225 may be configured to control fuel and/or air flow through the system, according to fuel composition data.

Figures 4A, 4B:
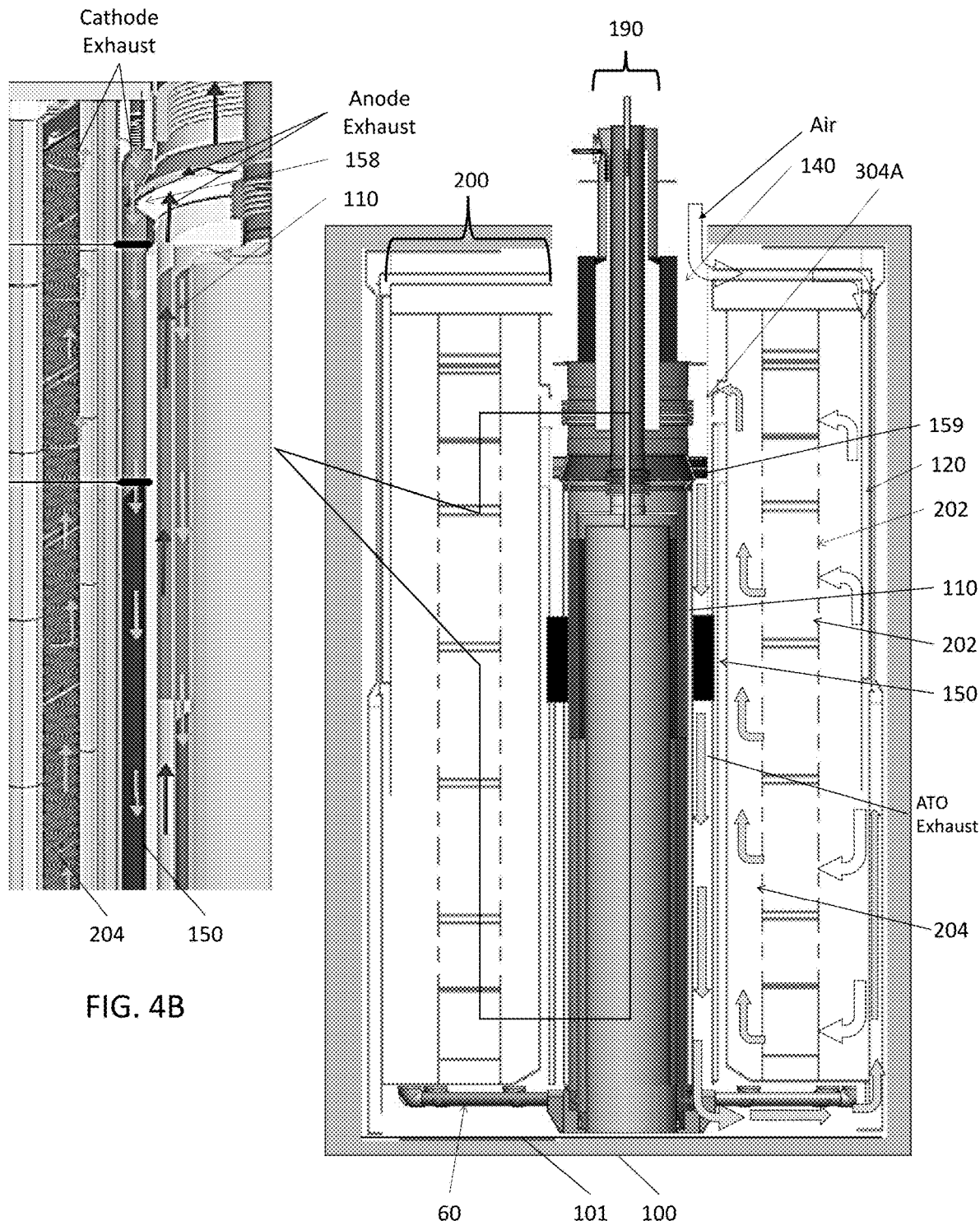
FIG. 4A is a sectional view showing components of the hotbox of the system of FIG. 3.
FIG. 4B shows an enlarged portion of FIG. 4A.

FIG. 4A is a sectional view showing components of the hotbox 100 of the system of FIG. 3, and FIG. 4B shows an enlarged portion of FIG. 4A. Referring to FIGS. 4A and 4B, the cathode recuperator 120 may be disposed inside of the hotbox 100, and the electrochemical cell columns 200 and a central column 190 may be surrounded by the cathode recuperator 120. The electrochemical cell columns 200 may comprise the cell columns 200A or 200B described above. For example, the cell columns 200 shown in FIG. 4A correspond to the cell columns 200A described above. In particular, the fuel cell columns 200 may be disposed arranged around the central column 190 in an annular (e.g., ring) configuration, such that an outer surface of each cell column 200 faces the cathode recuperator 120 and an inner surface faces the central column 190.

The central column 190 may include the ATO 150 and at least one heat exchanger, such as the anode recuperator 110 and the anode exhaust cooler 140. In particular, the anode recuperator 110 is disposed radially inward of the ATO 150, and the anode exhaust cooler 140 is mounted over the anode recuperator 110 and the ATO 150.

An anode hub structure 60 may be positioned under the anode recuperator 110 and ATO 150 and over a support 101, such as a hotbox base. The anode hub structure 60 is used to distribute fuel evenly from the central column 190 to cell columns 200 disposed around the central column 190.

Air (i.e., air inlet stream) enters the top of the hotbox 100 and then flows into the cathode recuperator 120 where it is heated by the ATO exhaust output from the ATO 150. The heated air then flows through the cathode recuperator 120 (e.g., between inner and outer walls of the cathode recuperator 120) and is then provided to the cell columns 200. In particular, the heated air may be provided to outward facing front surfaces (i.e., sides) 202 of the cell columns 200. The air then flows through the cell columns 200. If the cell columns 200 comprise solid oxide fuel cell columns 200, oxygen ions diffuse from the fuel cell cathode electrodes through the fuel cell electrolytes to the anode electrodes and react with fuel (i.e., the fuel inlet stream) provided from the anode hub structure 60 at the anode electrodes of the fuel cells 30. A cathode exhaust (i.e., air exhaust stream) is provided from inward facing, back surfaces (i.e., sides) 204 of the columns 200, before being routed to the optional vortex generator 159, where the cathode exhaust is swirled before entering the ATO 150.

The splitter 158 may direct the second portion of the anode exhaust (i.e., fuel exhaust stream) exiting the top of the anode recuperator 110 through openings (e.g., slits) in the splitter 158 into the swirled cathode exhaust (e.g., in the vortex generator 159 or downstream of the vortex generator 159 in exhaust conduit 304A or in the ATO 150). The anode and cathode exhaust streams may be mixed before entering the ATO 150, where the anode exhaust is oxidized by the cathode exhaust to generate the ATO exhaust stream. The ATO exhaust stream exiting the ATO 150 may flow down the central column 190 and then be provided to the cathode recuperator 120 to heat the air. The ATO exhaust stream exiting the cathode recuperator 120 may be exhausted from the top of the hotbox 100 or provided into an optional steam generator to generate steam.

Column Baffles

According to various embodiments, spaces between the cell columns 200 may be obstructed in order to prevent and/or reduce air from flowing between the cell columns and bypassing the electrochemical cells 30 in the cell columns 200. In particular, air bypass may reduce system efficiency and thermal uniformity. The air bypass may also result in reduced system blower 142 lifetime and efficiency, faster electrochemical cell 30 degradation, and ATO 150 temperature below target operating temperature, which may result in less carbon monoxide to carbon dioxide conversion.

Multi-component baffle assemblies 400 (e.g., 400A to 400E) are located between the respective adjacent cell columns 200 to block air output from the cathode recuperator 120 from flowing between the adjacent cell columns 200. In various embodiments, the baffle assemblies 400 may be formed from a high temperature metal alloy (e.g., an electrically conductive metal alloy), such as Inconel (e.g., Inconel 625 which includes, by weight, at least 58% Ni, 20-23% Cr. 8-10% Mo, and less than 5% of Fe, Nb and Co), while the side baffles 238 of the cell columns 200 may be formed from a ceramic (e.g., electrically insulating ceramic) material, such as alumina. During high temperature operation of the cell columns 200, a difference in coefficient of thermal expansion between the metal alloy baffle assemblies 400 and the ceramic side baffles 238 of the cell columns 200 may cause the baffle assemblies 400 to separate from the cell columns 200, which increases the undesirable air bypass between the adjacent cell columns 200.

In various embodiments, the multi-component baffle assemblies 400 include one or more air bypass mitigation features which enhance contact between the baffle assemblies 400 and the columns 200 during high temperature (e.g., 700 to 950 degrees Celsius) cell column operation to reduce or prevent air from bypassing the electrochemical cells in the columns 200. The operation includes providing air into the sides of the cell columns 200 and providing a reactant into the cell columns 200. The reactant may comprise a fuel if the cell columns 200 comprise fuel cell columns, or the reactant may comprise water if the cell columns 200 comprise electrolyzer cell columns. In one embodiment, the air may be provided into the front sides of fuel cell columns 200 or into the backsides of the electrolyzer cell columns 200. The air bypass mitigation features restrain the baffle assemblies 400 and the cell columns 200 from separating, and/or force the baffle assemblies 400 and the cell columns 200 against each other, and/or encapsulate the baffle assembles 400 to keep them in contact with the cell columns 200 during operation. The multi-component baffle assemblies 400 may also include tie rods which extend perpendicular to the stack direction of the cells in the cell columns 200 and which hold together the components (e.g., metal alloy plates) of each baffle assembly 400. In one embodiment, the tie rods may comprise tension rods which hold together the components of each baffle assembly 400 in tension rather than in compression.

In some embodiments, the cell columns 200 may also include structures designed to improve the sealing/air tightness of the baffle assembly 400 against the cell columns 200. For example, portions of the side surfaces of the cell columns 200 may be angled with respect to a plane of a remainder of the side surface to allow for increased force to be applied by the baffle assembly 400 to the cell columns 200.

Figure 5:
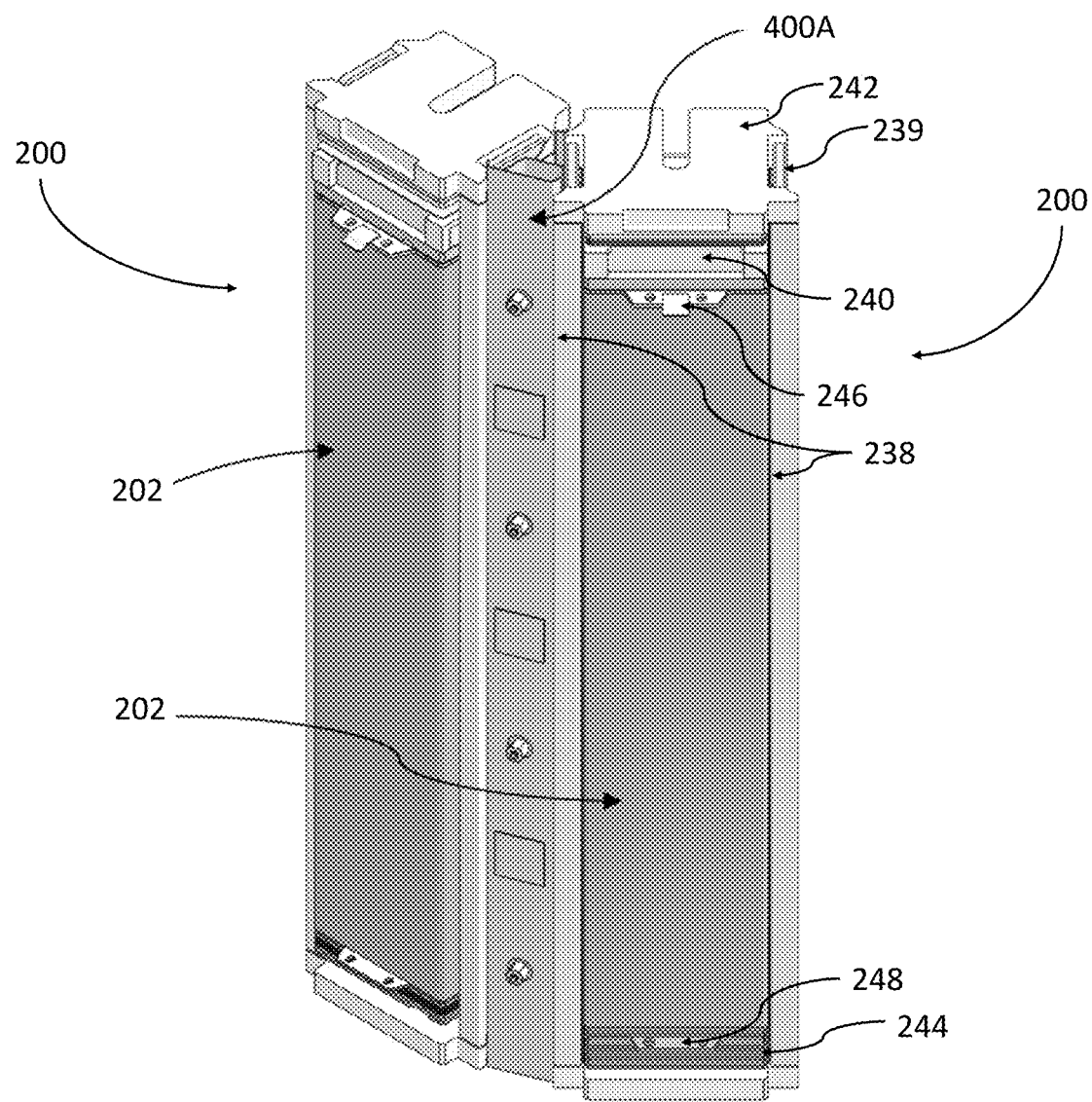
FIG. 5 is a perspective view of a baffle assembly disposed between adjacent cell columns, according to a first embodiment of the present disclosure.

FIG. 5 is a perspective view of a first baffle assembly 400A disposed between adjacent cell columns 200, according to a first embodiment of the present disclosure. As will be described in more detail below, the first baffle assembly 400A has a negative angle air bypass mitigation feature that is configured to prevent and/or reduce air leakage between adjunct cell columns 200 of an electrochemical system, such as the system of FIGS. 3, 4A and 4B, by using coefficient of thermal expansion (CTE) mismatch between the cell columns and the first baffle assembly to force the front baffle outwards into the cell column ceramic recesses and/or protrusions. While two cell columns 200 and one baffle assembly 400A are shown in FIG. 5 for clarity, multiple cell columns 200 may be arranged in a circular format, and a baffle assembly 400A may be disposed between each adjacent pair of cell columns 200.

The baffle assembly 400A may be wedged (e.g., friction fit) between the adjacent cell columns 200. The baffle assembly 400A includes a negative angle air bypass mitigation feature that is configured to apply a biasing force against side surfaces of the cell columns 200 (e.g., against the ceramic side baffles 238 and/or ceramic top plates 242). The cell columns 200 include recesses (e.g., notches) 250 and/or protrusions 252 in the ceramic materials (e.g., ceramic side baffles 238 and/or ceramic top plates 240) of the cell columns 200 for baffle assembly 400A to press against. As such, all or almost all air provided to the cell columns 200, such as heated air provided from a cathode recuperator 120 which surrounds the cell columns 200, may be prevented from bypassing the cell columns 200 and forced into the air inlets (e.g., open spaces between adjacent interconnects 10 of the cell columns 200) in the front sides 202 of the cell columns 200. Therefore, system efficiency and thermal stability may be increased.

Figure 6A:
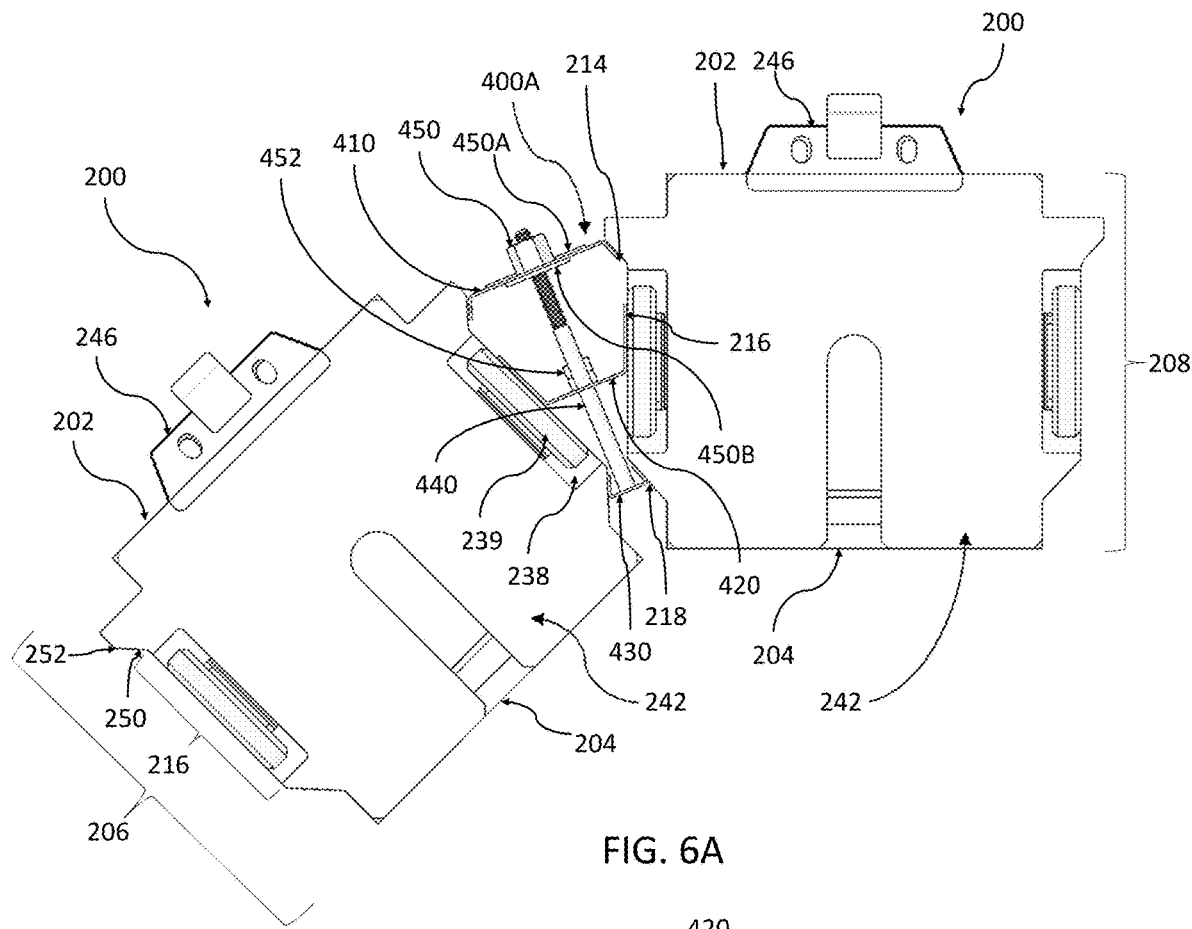
FIG. 6A is a top view of an exemplary baffle assembly disposed between adjacent cell columns, according to a first embodiment of the present disclosure.
Figure 6B:
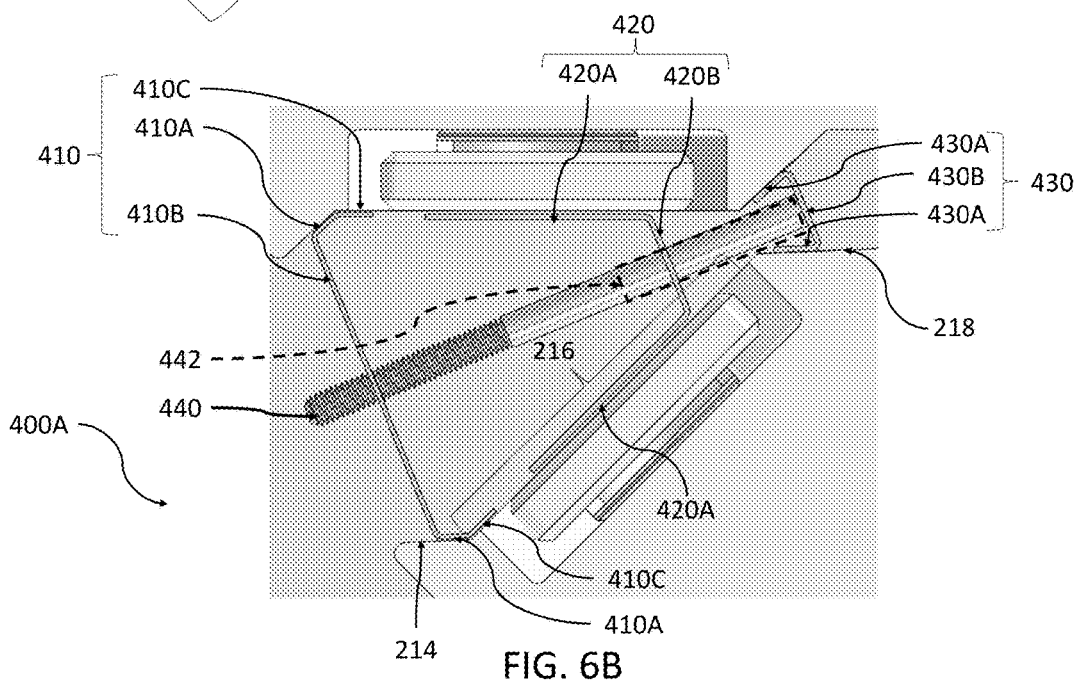
FIG. 6B is an enlarged view of a portion of FIG. 6A.
Figure 6C:
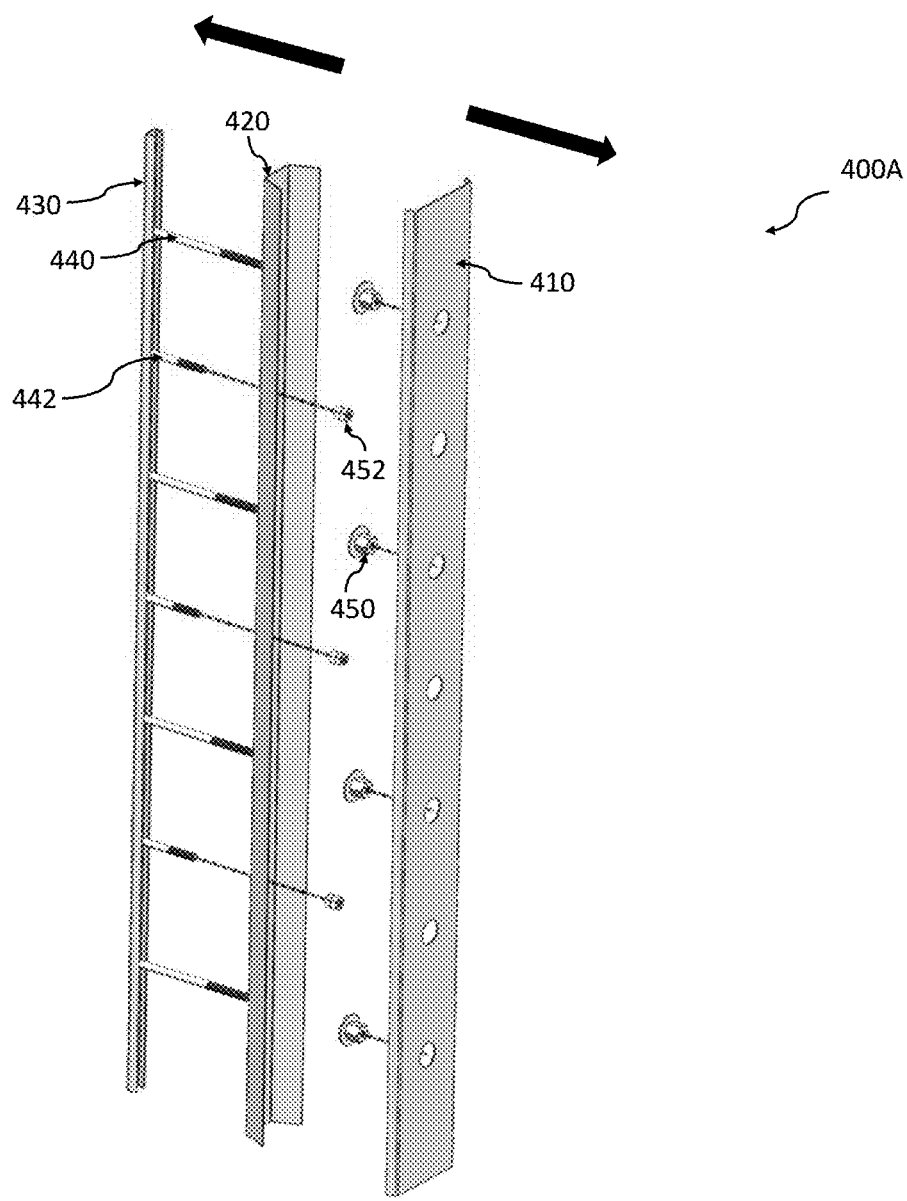
FIG. 6C is an exploded view of the baffle assembly of FIG. 6A.

FIG. 6A is a top view of the first baffle assembly 400A disposed between adjacent cell columns 200, according to the first embodiment of the present disclosure, FIG. 6B is an enlarged view of a portion of FIG. 6A, and FIG. 6C is an exploded view of the baffle assembly 400A of FIG. 6A.

Referring to FIGS. 6A-6C, the baffle assembly 400A may be friction fit between opposing first and second lateral surfaces (e.g., sides) 206, 208 of the cell columns 200, which may be substantially perpendicular to the front and back sides 202, 204 of the cell columns 200. The lateral surfaces 206, 208 may comprise outer surfaces of the ceramic side baffles 238 and/or the ceramic top plates 242 and/or ceramic bottom plates 244 described above.

In particular, the baffle assembly 400A may apply pressure to three or more surfaces, such as a first surface 214, a second surface 216, and a third surface 218 of each of the first and second sides 206, 208 of the adjacent cell columns 200. For example, the second surfaces 216 may be substantially perpendicular to the front and back sides 202, 204 of the cell columns 200. The first and third surfaces 214, 218 may be angled with respect to the second surfaces 216 at an angle of between 100 and 170 degrees, such as between 110 and 160 degrees, including between 120 and 150 degrees. In some embodiments, the first and third surfaces 214, 218 may be formed by protrusions (e.g., projections) 252 and/or recesses 250 formed in the side baffles 238, the top plates 242, and/or the bottom plates 244. The second surfaces 216 may be formed by portions of the side baffles 238, ceramic connectors 239, the top plates 242, and/or the bottom plates 244 that are substantially parallel to corresponding side surfaces of the fuel cells and interconnects of the cell columns 200. The second surfaces 216 may be located laterally between the respective first surfaces 214 and the respective third surfaces 218.

In the first embodiment, the multi-component baffle assembly 400A may include three or more baffles, such as a front baffle 410, a middle baffle 420, and a back baffle 430, and one or more tension rods. The middle baffle 420 may be located between the first baffle 410 and the back baffle 430. The baffles 410, 420, 430 may be formed of a metal or metal alloy, such as Inconel (e.g., Inconel 625, etc.). The metal or metal alloy comprise relatively thin sheet of metal or metal alloy to facilitate shaping/bending. In particular, the baffles 410, 420, 430 may be bent, such that the front baffle 410 includes opposing first angled portions 410A extending from opposing ends of a first base plate portion 410B, the middle baffle 420 includes opposing second angled portions 420A extending from opposing ends of a second base plate portion 420B, and the back baffle 430 includes opposing third angled portions 430A extending from opposing ends of a third base plate portion 430B. The angled portions 410A, 420A, 430A may be bent to match the angle of corresponding surfaces of the cell columns 200.

For example, the first angled portions 410A of the front baffle 410 may be configured to lie flush with (e.g., be substantially parallel to) the first surfaces 214, the second angled portions 420A of the middle baffle 420 may be configured to lie flush with the second surfaces 216, and the third angled portions 430A of the back baffle 430 may be configured to lie flush with the third surfaces 218. In some embodiments, the first and second angled portions 410A, 420A may be bent at obtuse angles with respect to the respective first and second base plate portions 410B, 420B of the front baffle 410 and the middle baffle 420. The third angled portions 430A may be bent at an acute angle with respect to the third base plate portion 430B of the back baffle 430. Thus, the additional middle baffle 420 contains second angled portions 420A which face the front baffle 410 and are bent at an obtuse angle with respect to the second base plate portion 420B. In contrast, the back baffle 430 contains third angled portions 430A which also face the front baffle 410 but are bent at an acute angle with respect to the third base plate portion 430B.

The front baffle 410 may also optionally include additional angled portions 410C which extend inward at an obtuse angle from the ends of the first angled portions 410A, as shown in FIG. 6B. The additional angled portions 410C also contact the second surfaces 216, but extend in the opposite direction from the second angled portions 420A. Thus, both the additional angled portions 410C of the front baffle 410 and the second angled portions 420A of the middle baffle 420 contact portions of the same second surfaces 216 for improved contact between the baffle assembly 400A and the adjacent electrochemical cell columns 200.

The one or more tension rods may include first compression rods 440 and second tension rods 442, as shown in FIG. 6C. The first compression rods 440 may be longer than the second tension rods 442. The first compression rods 440 may extend through the middle baffle 420 and may be used to attach the front baffle 410 to the back baffle 430. The second tension rods 442 may be used to attach the middle baffle 420 to the back baffle 430. The first and second tension rods 440, 442 may be formed of a metal or metal alloy, such as stainless steel or the like.

The first and second rods 440, 442 may have threaded first ends and opposing second ends. The second ends may be attached to the back baffle 430 (e.g., to the third base plate portion 430B) by any suitable method. For example, the second ends of the tension rods 440, 442 may be attached by welding, riveting, using fasteners, or the like. The first compression rods 440 may extend through the middle baffle 420 and may be attached to the front baffle 410 by first fasteners 450, such as reverse flange nuts, which are screwed onto threaded first ends of the first compression rods 440 which protrude through holes in the first base plate portions 410B of the front baffle 410. In some embodiments, the first fasteners 450 may each include a collar 450A and washer 450B located on opposite sides of the front baffle 410. As such, the first fasteners 450 may bias the front baffle 410 against the first surfaces 214. The first fasteners 450, such as reverse flange nuts, compress (e.g., jam) the front baffle 410 outwards into the recesses 250 and/or protrusions 252 in the ceramic components (238, 242, 244) of the adjacent cell columns 200. This forms the negative angle air bypass mitigation feature of the first embodiment. During high temperature operation of the system, the difference in CTE between the cell columns 200 and the first baffle assembly 400A forces the front baffle 410 outwards into the recesses 250 and/or protrusions 252 in the ceramic components (238, 242, 244) of the adjacent the cell columns 200.

The second tension rods 442 may be fastened to the middle baffle 420 by corresponding second fasteners 452, such as nuts. The second tension rods 442 and the second fasteners 452 may be configured to generate tension between the middle baffle 420 and the back baffle 430, such that the middle baffle 420 and the back baffle 430 are biased against corresponding portions of the cell columns 200. For example, the middle baffle 420 may be biased against flat portions (i.e., the second surfaces 216) of the first and second sides 206, 208 of the cell columns 200, and the back baffle 430 may be biased against the third angled surfaces 218. Thus, the cell column 200 ceramic material may encapsulate the front baffle 410 and use CTE mismatch with the baffle assembly 400A to inhibit air flow during high temperature operation of the system.

Figure 6D:
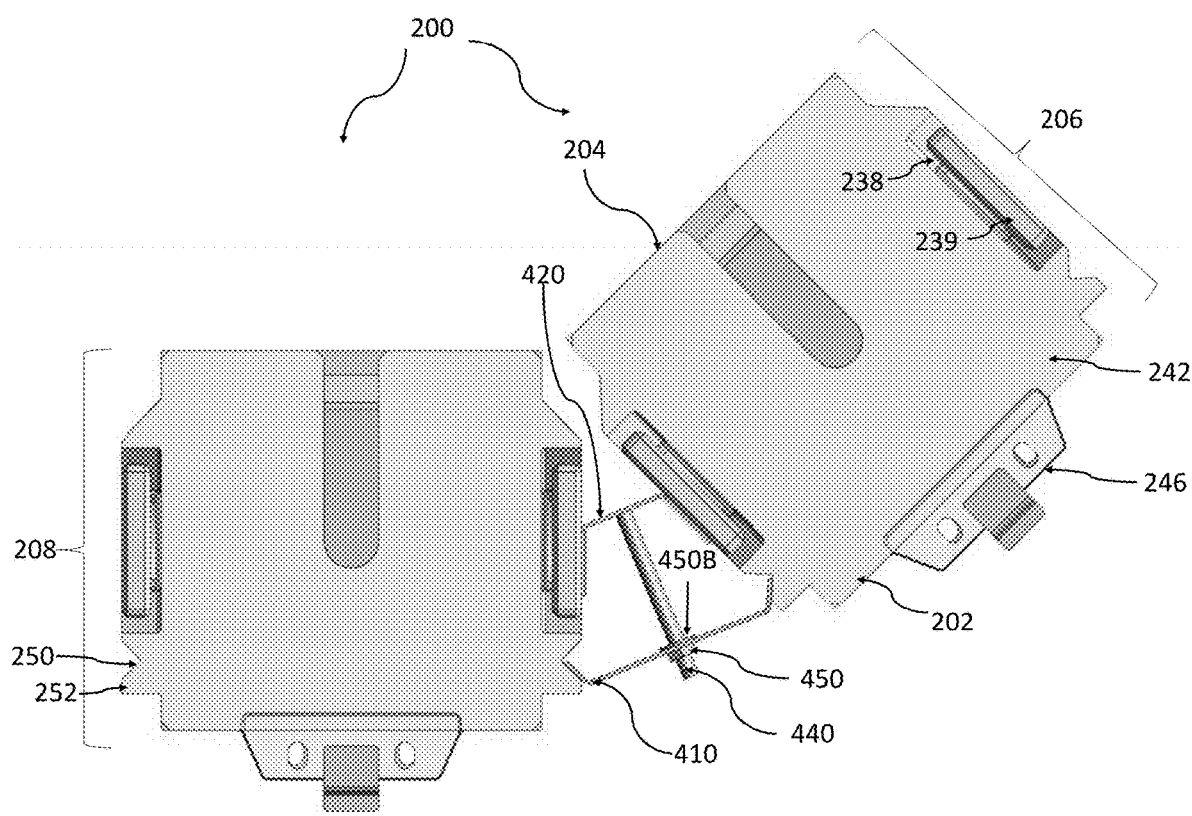
FIG. 6D is a top view of an alternative configuration of the exemplary baffle assembly disposed between adjacent cell columns, according to the first embodiment of the present disclosure.
Figure 6E:
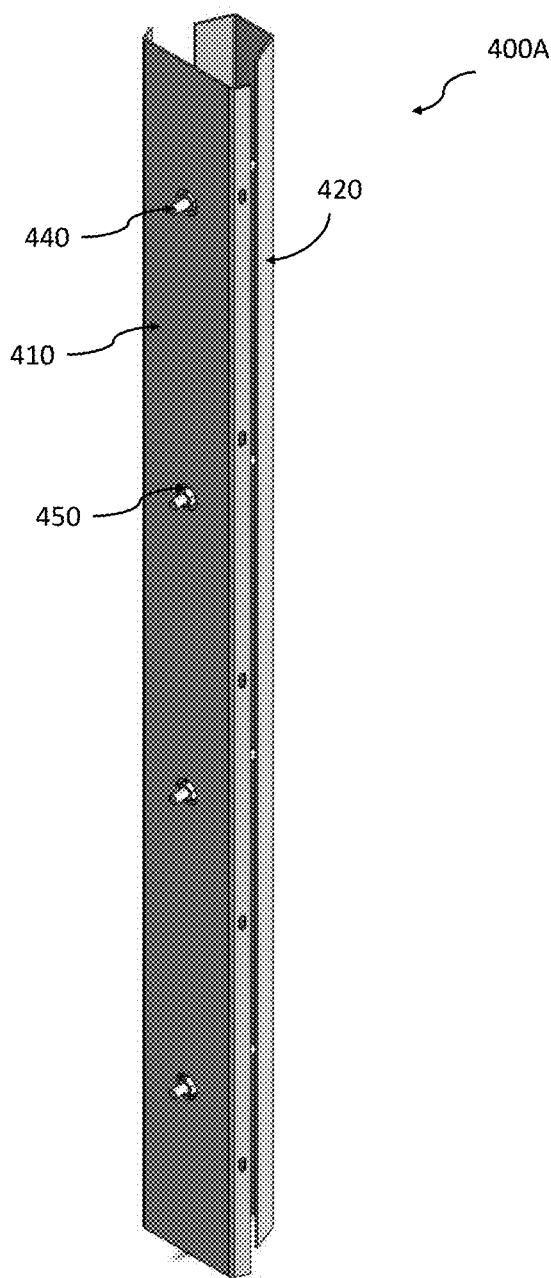
FIG. 6E is an exploded view of the baffle assembly of FIG. 6D.

In an alternative configuration of the first baffle assembly 400A shown in FIGS. 6D and 6E, the back baffle 430 is omitted. In this alternative configuration, the rods 440 connect the front baffle 410 to the middle baffle 420. The first end of the rods 440 is connected to the middle baffle 420 by welding, riveting, using fasteners, or the like. The fasteners 450 on the threaded second ends of rods 440 jam the front baffle 410 outwards into the recesses 250 and/or protrusions 252 in the ceramic components (238, 242, 244) of the adjacent cell columns 200. During high temperature operation of the system, the difference in CTE between the cell columns 200 and the first baffle assembly 400A forces the front baffle 410 outwards into the recesses 250 and/or protrusions 252 in the ceramic components (238, 242, 244) of the adjacent the cell columns 200.

Figure 7A:
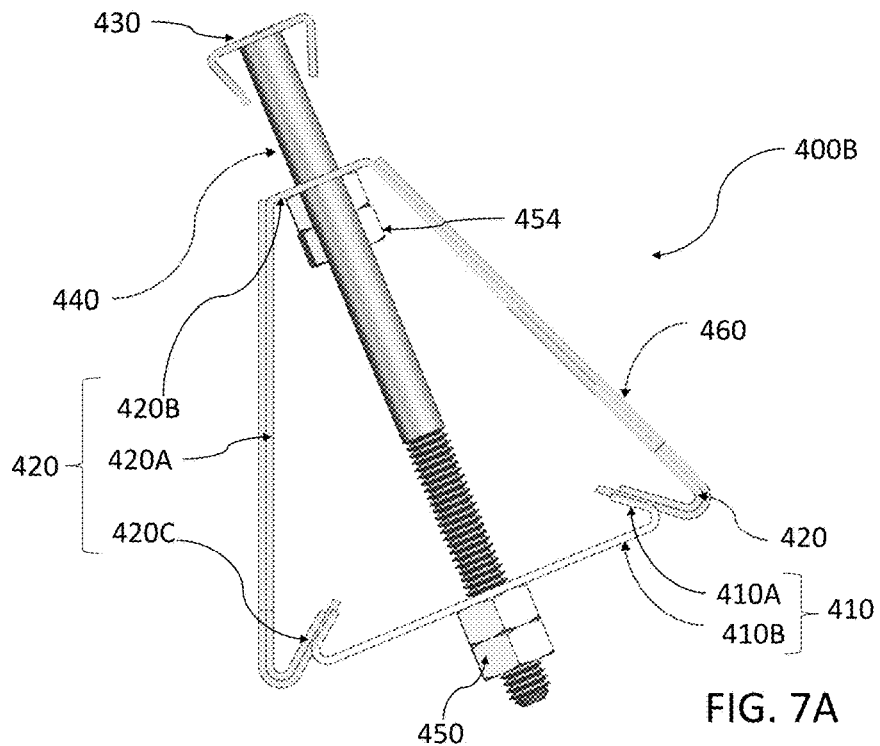
FIG. 7A is a top view of a first alternative baffle assembly, according to a second embodiment of the present disclosure.
Figure 7B:
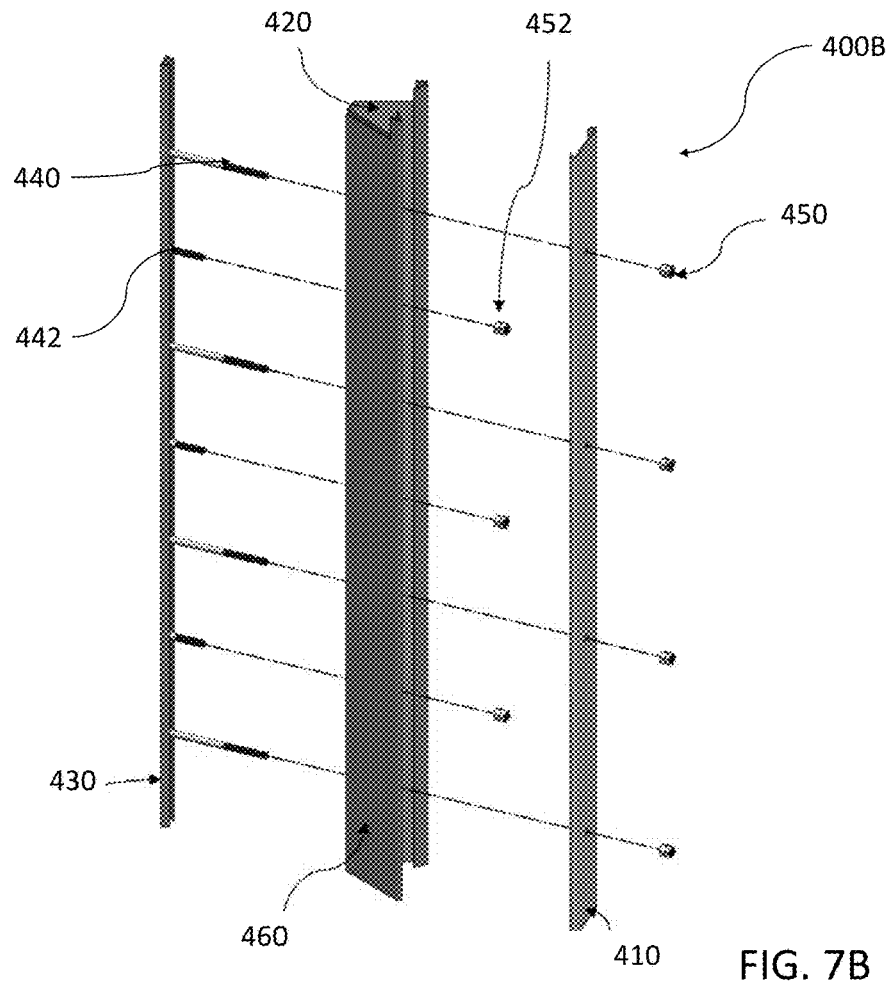
FIG. 7B is an exploded view of the baffle assembly of FIG. 7A.

FIG. 7A is a top view of a second baffle assembly 400B, according to a second embodiment of the present disclosure, and FIG. 7B is an exploded view of the baffle assembly 400B of FIG. 7A. The baffle assembly 400B may be similar to the baffle assembly 400A, except that the second baffle assembly 400B includes a double interference air bypass mitigation feature instead of the negative angle air bypass mitigation feature. As such, only the differences therebetween will be discussed in detail.

Referring to FIGS. 7A and 7B, the baffle assembly 400B may include a front baffle 410, a middle baffle 420, a back baffle 430, first tension rods 440, second tension rods 442, and a compliant layer 460. The front baffle 410 may include opposing first angled portions 410A which extend at an acute angle from ends of the first base plate portion 410B of the front baffle 410. The middle baffle 420 may include opposing first angled portions 420A which extend at an obtuse angle from ends of the second base plate portion 420B of the middle baffle 420. The middle baffle 420 may also include opposing additional angled portions 420C which extend at an acute angle from ends of the first angled portions 420A of the middle baffle 420. The first angled portions 410A and additional angled portions 420C are substantially parallel to one another and contact opposing sides of a first end of the respective compliant layer 460 which is located between the first angled portions 410A and additional angled portions 420C. The first angled portions 420A are parallel to the flat second surfaces 216 of the electrochemical cell columns 200. The second end of the respective compliant layer 460 is located between the first angled portions 420A and the flat second surfaces 216, and seals the first angled portions 420A against the flat second surfaces 216.

The front baffle 410 may be attached to the first tension rods 440 using first fasteners 450. The middle baffle 420 may be attached to the second tensions rods 442 using second fasteners 452, such that all three baffles 410, 420 and 430 are connected to each other in tension. The double interference air bypass mitigation feature causes the first angled portions 410A of the front baffle 410 and the additional angled portions 420C of the middle baffle 420 to push against each other, which causes the second angled portions 420A of the middle baffle to be pressed against the second ends of the respective compliant layers 260 contacting the second surfaces 216 of the cell columns 200. Thus, the interfering geometries promote horizontal "wedging out" of the baffle assembly 400B toward the cell columns 200 during high temperature system operation. Therefore, even if the adjacent cell columns 200 move laterally apart from the second baffle assembly 400B during system operation due to CTE differences, the double interference air bypass mitigation feature causes the second angled portions 420A of the middle baffle 420 to move outwardly toward the adjacent cell columns 200 and to inhibit the flow of air between the columns. Unlike the first baffle assembly 400A, the front baffle 410 of the second baffle assembly 400B does not necessarily contact adjacent cell columns 200.

The compliant layer 460 may be formed of a fibrous material, such as a ceramic felt. The compliant layer 460 may have a lower CTE and a higher flexibility, bendability and compressibility than that other components of the baffle assembly 400B, such as the baffles 410, 420, 430. The compliant layer 460 may be disposed on an outer surface of the angled portions 420A, 420C of the middle baffle 420. For example, the compliant layer 460 may include a first end disposed between the first angled portion 410A and the additional angled portion 420C, and a second end disposed between the first angled portion 420A and the second surface 216 of the cell columns 200. The compliant layer 460 may improve air flow inhibition between the front baffle 410 and the middle baffle 420 and may also improve air flow inhibition between the middle baffle 420 and the second surface 216 of the adjacent cell column 200.

Figure 8:
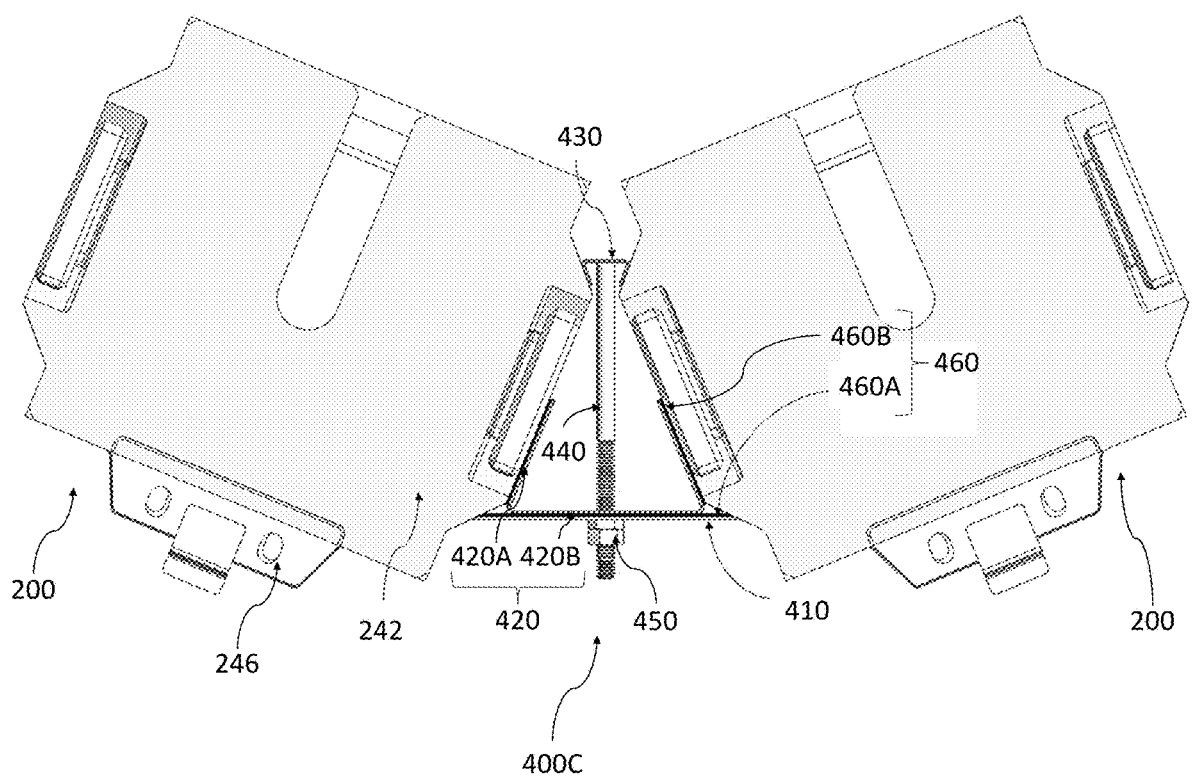
FIG. 8 is a top view of a second alternative baffle assembly, according to a third embodiment of the present disclosure.

FIG. 8 is a top view of a third baffle assembly 400C, according to a third embodiment of the present disclosure. The third baffle assembly 400C may be similar to the baffle assembly 400A, except that the third baffle assembly 400C includes an expansion gasket air bypass mitigation feature instead of the negative angle air bypass mitigation feature. As such, only the differences therebetween will be discussed in detail.

Referring to FIG. 8, the baffle assembly 400C may include the front baffle 410, the middle baffle 420, the back baffle 430, the first tension rods 440, and the compliant layer 460. The front baffle 410 may be substantially flat (e.g., may comprise only the first base plate portion and not include angled portions). However, some amount of camber may be imparted to the front baffle 410, depending upon an amount of tension applied to the front baffle 410 by the first fasteners 450 and/or due to indirect contact with the cell columns 200.

At least a portion of the compliant layer 460 may be formed of a fibrous ceramic material, such as an intumescent (i.e., swellable) material which expands (e.g., swells) as a result of heat exposure at high system operating temperatures. The intumescent material may expand by at least 100%, such as 100 to 400% between room temperature and 700 degrees Celsius. An example of such intumescent material is Kaowool® 333-E paper from Morgan Advanced Materials, which includes Kaowool® ceramic fibers, organic binders and other additives formed into a ceramic containing paper. Such material expands by up to 400% upon exposure to heat. Kaowool® ceramic fibers are produced from kaolin, which is an alumina-silica fire clay.

The compliant layer 460 may include a gasket portion (e.g., first end or first portion) 460A made of the intumescent material disposed between an outer surface of the second base plate portion 420B of the middle baffle 420 and an inner surface of the front baffle 410. The gasket portion 460A of the compliant layer 460 may operate as a gasket between the front baffle 410 and the middle baffle 420 in order to improve air flow inhibition (e.g., air tightness) of the baffle assembly 400C during operation of the system by expanding during relative movement between the cell columns 200 and the third baffle assembly 400C due to a CTE difference between them.

The compliant layer 460 may also include a second end or second portion 460B made of an intumescent or a non-intumescent material located between the angled portion 420A of the middle baffle 420 and the flat second surface 216 of the adjacent cell column 200. If the compliant layer 460 is continuous, then it includes a first end (i.e., gasket portion) 460A and a second end 460B. If the compliant layer 460 is discontinuous, then it includes a first portion (i.e., gasket portion) 460A and a second portion 460B. In this case, there may be a single gasket portion 460A and two second portions 460B of the discontinuous compliant layer 460.

The second angled portions 420A extend away at an acute angle from the second base plate portion 420B and from the front baffle 410 towards the back baffle 430. In particular, the angled portions 420A may be configured to press against the second ends or second portions 460B of the compliant layers 460 which contact the second surfaces 216 of the cell columns 200.

Figure 9:
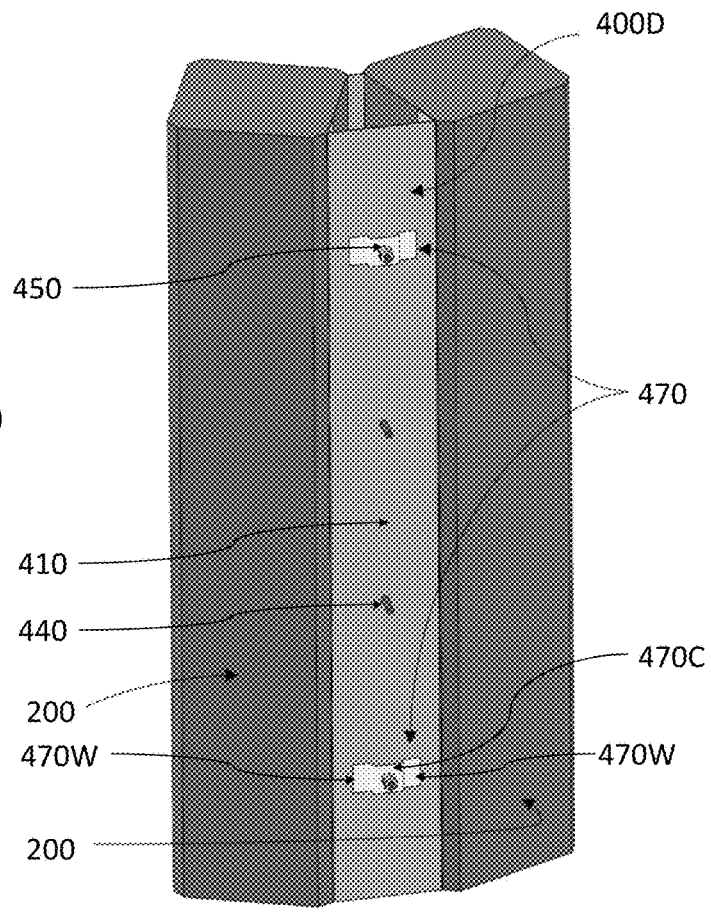
FIG. 9 is a perspective view of a third alternative baffle assembly disposed between cell columns, according to a fourth embodiment of the present disclosure.

FIG. 9 is a perspective view of a fourth baffle assembly 400D disposed between cell columns 200, according to a fourth embodiment of the present disclosure. The baffle assembly 400D may be similar to any of the baffle assemblies 400A-400C. As such, only the differences therebetween will be discussed in detail.

Referring to FIG. 9, the fourth baffle assembly 400D may include a spring air bypass mitigation feature. The spring air bypass mitigation feature includes at least one biasing device 470 disposed between the first fasteners 450 and the front baffle 410. In one embodiment, the biasing device 470 may be a metal or ceramic spring configured to apply pressure on the front baffle 410 toward the back baffle 430 of the fourth baffle assembly 400D. A such, the biasing device 470 may be configured to apply a restoring force on the front baffle 410 during high temperature operation of the system. This restoring force applied by the baffle assembly 400D to the cell columns 200 reduces radial movement of the cell columns 200, and thereby provides improved air flow inhibition of the baffle assembly 400D.

In one embodiment, the biasing devices 470 may comprise a mesa-type curved ceramic spring having a central (e.g., mesa) portion 470C and two wing portions 470W extending from opposing ends of the central portion 470. The central portion 470C surrounds the tension rod 440, while the wing portions 470W are curved toward the front baffle 410 relative to the central portion 470C. During operation of the system, the wing portions 470W press the front baffle 410 toward the cell columns 200.

In another embodiment, the biasing device 470 comprises a disc spring, such as a belleville washer. The belleville washer is a metal conical disc spring which presses the front baffle 410 toward the cell columns 200. The biasing device 470 of the spring air bypass mitigation feature may be used alone or in combination with the negative angle, double interference or gasket air bypass mitigation features described above.

Figure 10:
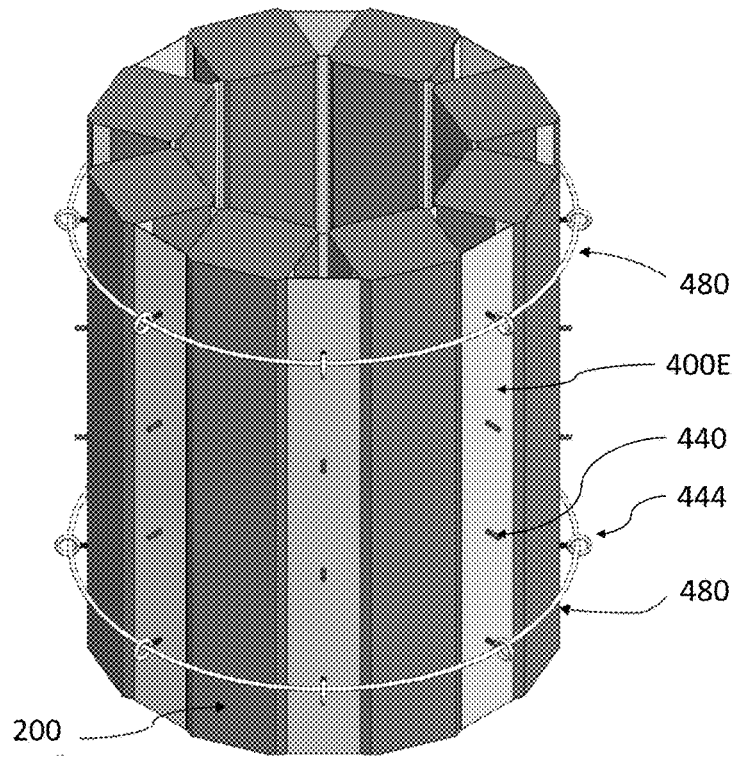
FIG. 10 is a perspective view of fourth alternative baffle assemblies disposed between cell columns, according to a fifth embodiment of the present disclosure.

FIG. 10 is a perspective view of a fifth baffle assembly 400E disposed between cell columns 200, according to the fifth embodiment of the present disclosure. The fifth baffle assembly 400E utilizes a restraint air bypass mitigation feature.

Referring to FIG. 10, the restraint air bypass mitigation feature comprises a restraint which prevents radial movement of the cell columns 200 and the fifth baffle assemblies 400E. In one embodiment, the restraint air bypass mitigation feature comprises one or more tension rings 480, such as two or more tension rings 480 that apply inward radial force on the baffle assemblies 400E.

In one embodiment, the tension rings 480 may apply the inward radial force to the first tension rods 440 of the fifth baffle assemblies 400E. In particular, the baffle assemblies 400E may include guide rings 444 that are connected to and extend from the first tension rods 440. The tension rings 480 may be fed through the guide rings 444. The tension rings 480 reduce and/or prevent movement of the baffle assemblies 400E and the cell columns 200 in an outward radial direction away from the central column of the system.

In another embodiment, the guide rings 444 may be connected to and extend from the front baffles 410 instead of from the first tension rods 440. In yet another embodiment, the tension rings 480 may be wrapped around the assemblies 440E and the cell columns 200 without passing through any guide rings.

The tension rings 480 may have a lower CTE than that of the baffles 400E. For example, the tension rings 480 may be formed of a fibrous ceramic material (e.g., a ceramic fiber), while the assemblies 400E are formed from a metal or metal alloy. As such, the restoring force applied by the tension rings 480 to the assemblies 400E due to their increasing CTE mismatch increases at increasing system operating temperatures.

The restraint air bypass mitigation feature including the at least one tension ring feature may be used alone or in combination with the negative angle, double interference, gasket and/or spring air bypass mitigation features described above. If the restraint air bypass mitigation feature is used alone, then the baffle assembly 400E may comprise a single baffle, two baffles or three or more baffles. For example, the single baffle may comprise the front baffle 410 having the first base plate portion and the first opposing first angled portions extending away from the opposing ends of the first base plate portion, as described above with respect to the first embodiment. If there are two baffles in the baffle assembly 400E, then they may comprise the front baffle 410 and the back baffle 430 described above.

Fuel cell systems of the embodiments of the present disclosure are designed to reduce greenhouse gas emissions and have a positive impact on the climate.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. An electrochemical cell system, comprising:
   electrochemical cell columns arranged in an annular configuration over a support, each cell column having a front side that faces away from a center of the annular configuration, a back side that faces the center of the annular configuration, and opposing first and second sides that connect the front and the back sides; and
   multi-component baffle assemblies located between adjacent cell columns and having at least one air bypass mitigation feature configured to reduce or prevent air from flowing between the cell columns,
   wherein the at least one air bypass mitigation feature comprises at least one metal baffle having a base plate portion that has an outer surface that faces away from the center of the annular configuration.

2. The electrochemical system of claim 1, further comprising:
   a cathode recuperator heat exchanger surrounding the cell columns and configured to provide heated air to the front sides of the cell columns; and
   a central column comprising at least one fuel heat exchanger located at the center of the annular configuration.

3. The electrochemical system of claim 1, wherein the at least one air bypass mitigation feature comprises a double interference air bypass mitigation feature comprising plural baffles of each of the baffle assemblies having respective base plate portions and respective angled portions which are configured to move outwardly toward the adjacent cell columns during operation of the electrochemical system.

4. The electrochemical system of claim 1, wherein the cell columns comprise solid oxide fuel cell columns.

5. The electrochemical system of claim 1, wherein the cell columns comprise solid oxide electrolyzer cell columns.

6. The method of claim 1, wherein:
   the at least one air bypass mitigation feature further comprises compression rods that force the baffle assemblies and the cell columns against each other; and
   the compression rods extend through the at least one metal baffle in each of the baffle assemblies in a first horizontal direction perpendicular to a stacking direction of the electrochemical cells in the cell columns.

7. The electrochemical system of claim 1, wherein:
   the cell columns further comprise ceramic side baffles that form the first and second sides of the cell columns; and
   opposing portions of the at least one metal baffle contact the first and second sides of the adjacent cell columns.

8. An electrochemical cell system, comprising:
   electrochemical cell columns arranged in an annular configuration over a support, each cell column having a front side that faces away from a center of the annular configuration, a back side that faces the center of the annular configuration, and opposing first and second sides that connect the front and the back sides; and
   multi-component baffle assemblies located between adjacent cell columns and comprising a negative angle air bypass mitigation feature configured to reduce or prevent air from flowing between the cell columns,
   wherein the negative angle air bypass mitigation feature comprises plural baffles of each of the baffle assemblies having respective base plate portions and respective angled portions which extend away from opposing ends of the respective base plate portions at acute and obtuse angles, rods that connect the plural baffles, and fasteners that fasten a first one of the plural baffles to the rods and which force the first one of the plural baffles into at least one of recesses or protrusions in ceramic components of the adjacent cell columns.

9. The electrochemical system of claim 8, wherein:
   the first one of the plural baffles comprises a front baffle comprising a first base plate portion and opposing first angled portions extending away from the opposing ends of the first base plate portion and contacting first surfaces of the first and second sides of the adjacent cell columns; and
   the plural baffles of each of the baffle assemblies further comprise:

a middle baffle comprising a second base plate portion and opposing second angled portions extending away from the opposing ends of the second base plate portion at an obtuse angle and contacting second surfaces of the first and second sides of the adjacent cell columns; and a back baffle comprising a third base plate portion and opposing third angled portions extending away from the opposing ends of the third base plate portion at an acute angle and contacting third surfaces of the first and second sides of the adjacent cell columns.

10. The electrochemical system of claim 9, wherein:
the rods comprise first compression rods that extend through the middle baffle and connect the front baffle to the back baffle;
the fasteners comprise first fasteners that fasten the front baffle to the first compression rods and which force the front baffle into at least one of the recesses or the protrusions in the ceramic components of the adjacent cell columns; and
each of the baffle assemblies further comprises second tension rods that connect the back baffle to the middle baffle, and second fasteners that fasten the middle baffle to the second tension rods.

11. The electrochemical system of claim 9, wherein:
the second surfaces are substantially perpendicular to the front and back sides of the cell column; and
the first and third surfaces are disposed at an obtuse angle with respect to the corresponding second surfaces.

12. The electrochemical system of claim 11, wherein:
the front baffle further comprises opposing additional angled portions that extend at an acute angle from the first angled portions; and
the second angled portions contact the second surfaces of the adjacent cell columns.

13. The electrochemical system of claim 8, wherein the plural baffles comprise of each of the baffle assemblies:
a front baffle comprising a first base plate portion and opposing first angled portions extending away at an acute angle from the opposing ends of the first base plate portion; and
a middle baffle comprising a second base plate portion and opposing second angled portions extending away from the opposing ends of the second base plate portion at an obtuse angle and opposing additional angled portions which extend at an acute angle from ends of the first angled portions, wherein the first angled portions and additional angled portions are substantially parallel to one another and contact opposing sides of respective compliant layers located between the first angled portions and the additional angled portions.

14. The electrochemical system of claim 13, wherein the compliant layers comprise a ceramic felt which also extends between the second angled portions and the first and second sides of the adjacent cell columns.

15. An electrochemical cell system, comprising:
electrochemical cell columns arranged in an annular configuration over a support, each cell column having a front side that faces away from a center of the annular configuration, a back side that faces the center of the annular configuration, and opposing first and second sides that connect the front and the back sides; and
multi-component baffle assemblies located between adjacent cell columns and having at least one air bypass mitigation feature configured to reduce or prevent air from flowing between the cell columns,
wherein the at least one air bypass mitigation feature comprises a gasket air bypass mitigation feature comprising an intumescent material located between plural baffles of each of the baffle assemblies.

16. A electrochemical system of claim 15, wherein the plural baffles of each of the baffle assemblies comprise:
a front baffle comprising a first base plate portion; and
a middle baffle comprising a second base plate portion and opposing second angled portions extending away from the opposing ends of the second base plate portion at an acute angle, wherein the intumescent material is located between the first base plate portion and the second base plate portion, and between the second angle portions and the first and second sides of the adjacent cell columns.

17. An electrochemical cell system, comprising:
electrochemical cell columns arranged in an annular configuration over a support, each cell column having a front side that faces away from a center of the annular configuration, a back side that faces the center of the annular configuration, and opposing first and second sides that connect the front and the back sides; and
multi-component baffle assemblies located between adjacent cell columns and comprising a restraint air bypass mitigation feature configured to reduce or prevent air from flowing between the cell columns, the restraint air bypass mitigation feature comprising at least one tension ring that applies inward radial force on the baffle assemblies and the cell columns, wherein:
a coefficient of thermal expansion (CTE) of the baffle assemblies is higher than a CTE of the at least one tension ring; and
the at least one tension ring comprises a ceramic fiber material.

18. An electrochemical cell system, comprising:
electrochemical cell columns arranged in an annular configuration over a support, each cell column having a front side that faces away from a center of the annular configuration, a back side that faces the center of the annular configuration, and opposing first and second sides that connect the front and the back sides; and
multi-component baffle assemblies located between adjacent cell columns and having at least one air bypass mitigation feature configured to reduce or prevent air from flowing between the cell columns, wherein:
the at least one air bypass mitigation feature is configured to reduce or prevent the air from flowing between the cell column by at least one of restraining the baffle assemblies and the cell columns from separating, forcing the baffle assemblies and the cell columns against each other, or encapsulating the baffle assembles to keep them in contact with the cell columns;
the baffle assemblies comprise plural metal alloy components which are held together by tie rods which extend perpendicular to a stacking direction of electrochemical cells in the cell columns; and
a coefficient of thermal expansion (CTE) of the baffle assemblies is higher than a CTE of the cell columns.

19. A method, comprising:
providing a reactant into electrochemical cell columns arranged in an annular configuration over a support, each cell column having a front side that faces away from a center of the annular configuration, a back side that faces the center of the annular configuration, and opposing first and second sides that connect the front and the back sides, wherein baffle assemblies are located between adjacent cell columns; and providing air into the front side of each cell column, wherein at least one air bypass mitigation feature of the baffle assemblies reduces or prevents the air from flowing between the cell column by at least one of restraining the baffle assemblies and the cell columns from separating, forcing the baffle assemblies and the cell columns against each other, or encapsulating the baffle assembles to keep them in contact with the cell columns, wherein the at least one air bypass mitigation feature comprises at least one metal baffle having a base plate portion that has an outer surface that faces away from the center of the annular configuration.

20. An electrochemical cell system, comprising:

electrochemical cell columns arranged in an annular configuration over a support, each cell column having a front side that faces away from a center of the annular configuration, a back side that faces the center of the annular configuration, and opposing first and second sides that connect the front and the back sides; and multi-component baffle assemblies located between adjacent cell columns and having at least one air bypass mitigation feature configured to reduce or prevent air from flowing between the cell columns, wherein the baffle assemblies each comprise:

a first baffle having a base plate portion that has an outer surface that faces away from the center of the annular configuration; and at least one biasing device disposed on the outer surface and configured to apply a restoring force to the multi-component baffle assembly in a direction perpendicular to a stacking direction of the electrochemical cells in the cell columns, such that the first baffle is pressed against the adjacent cell columns during operation of the electrochemical system.

21. The electrochemical system of claim 20, wherein the first baffle comprises a metal baffle, and the at least one biasing device comprises a mesa-type ceramic spring or a disc spring.

22. The electrochemical system of claim 20, wherein:

the at least one air bypass mitigation feature further comprises compression rods; and the compression rods extend through the baffle assemblies in a first horizontal direction perpendicular to a stacking direction of the electrochemical cells in the cell columns.

23. An electrochemical cell system, comprising:

electrochemical cell columns arranged in an annular configuration over a support, each cell column having a front side that faces away from a center of the annular configuration, a back side that faces the center of the annular configuration, and opposing first and second sides that connect the front and the back sides; and multi-component baffle assemblies located between adjacent cell columns and having at least one air bypass mitigation feature configured to reduce or prevent air from flowing between the cell columns, wherein the baffle assemblies comprise compression rods that extend through the baffle assemblies in a first horizontal direction perpendicular to a stacking direction of the electrochemical cells in the cell columns, the compression rods configured to bias the baffle assemblies against the first and second sides of the adjacent cell columns.

* * * * *